Figure 1:
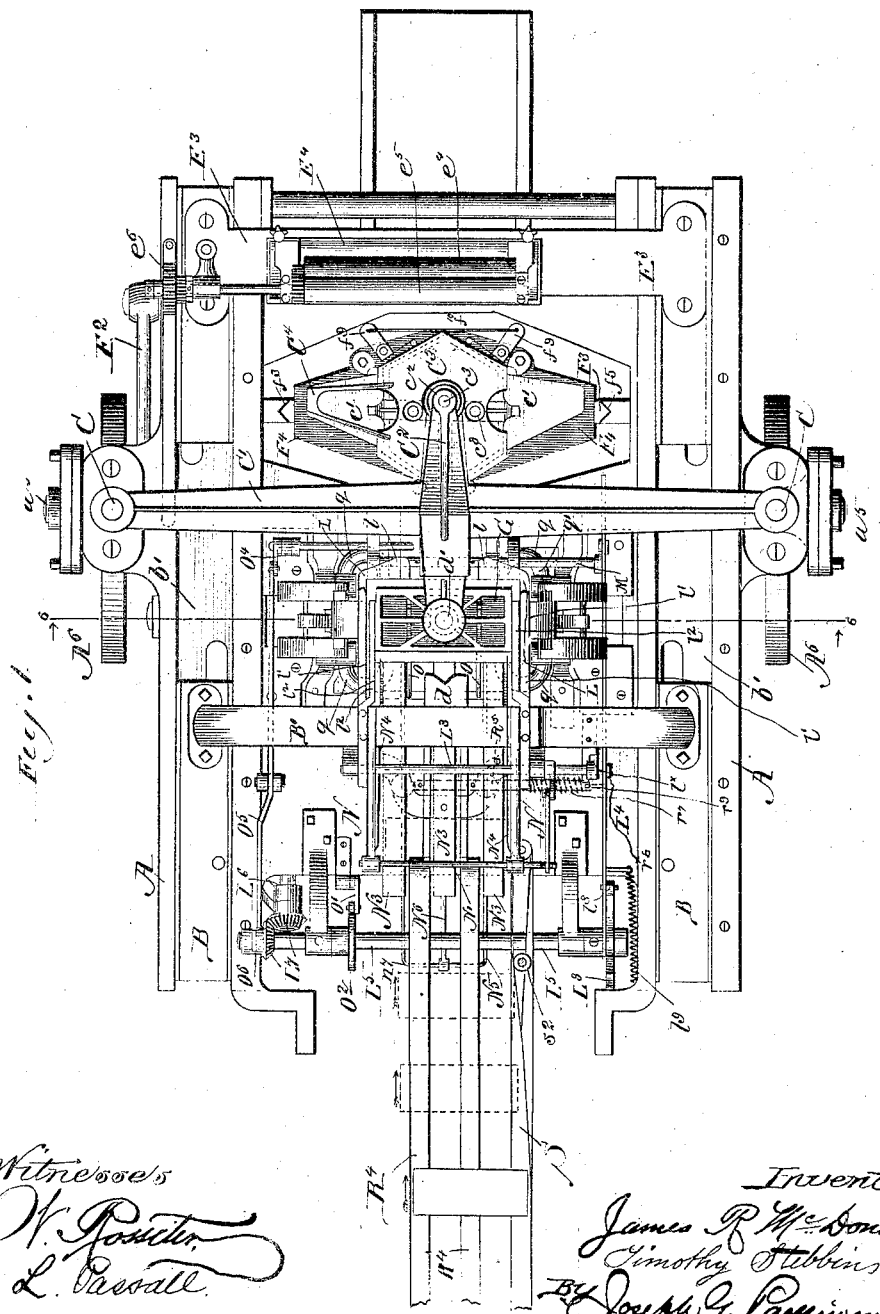

(No Model.) 20 Sheets—Sheet 1.

J. R. McDONALD & T. STEBBINS.
MACHINE FOR MAKING ENVELOPES.

No. 464,984. Patented Dec. 15, 1891.

Witnesses
W. Rossiter
L. Passall

Inventors
James R. McDonald
Timothy Stebbins
By Joseph G. Parnicky
Atty.

(No Model.)

20 Sheets—Sheet 2.

J. R. McDONALD & T. STEBBINS.
MACHINE FOR MAKING ENVELOPES.

No. 464,984. Patented Dec. 15, 1891.

Witnesses
W. Rossiter
L. Pascall

Inventors
James R. McDonald
Timothy Stebbins
By their Attorney
Joseph T. Brunson (No Model.) 20 Sheets—Sheet 3.

J. R. McDONALD & T. STEBBINS.
MACHINE FOR MAKING ENVELOPES.

No. 464,984. Patented Dec. 15, 1891.

Witnesses

Inventors
James R. McDonald
Timothy Stebbins
By Joseph M. Parkinson
Attorney (No Model.) 20 Sheets—Sheet 9.

J. R. McDONALD & T. STEBBINS.
MACHINE FOR MAKING ENVELOPES.

No. 464,984. Patented Dec. 15, 1891.

Witnesses

Inventors

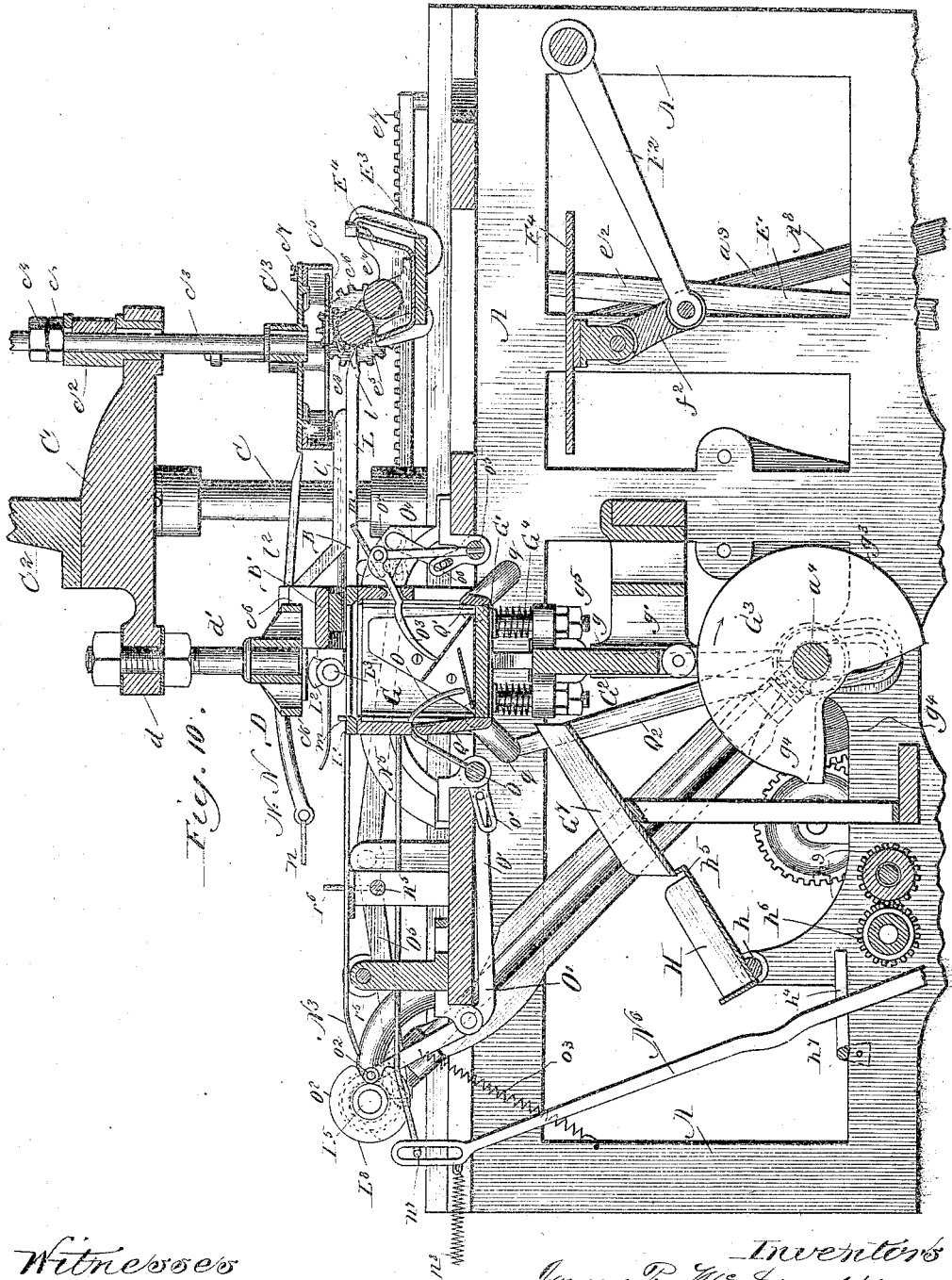

(No Model.) 20 Sheets—Sheet 11.
J. R. McDONALD & T. STEBBINS.
MACHINE FOR MAKING ENVELOPES.
No. 464,984. Patented Dec. 15, 1891.
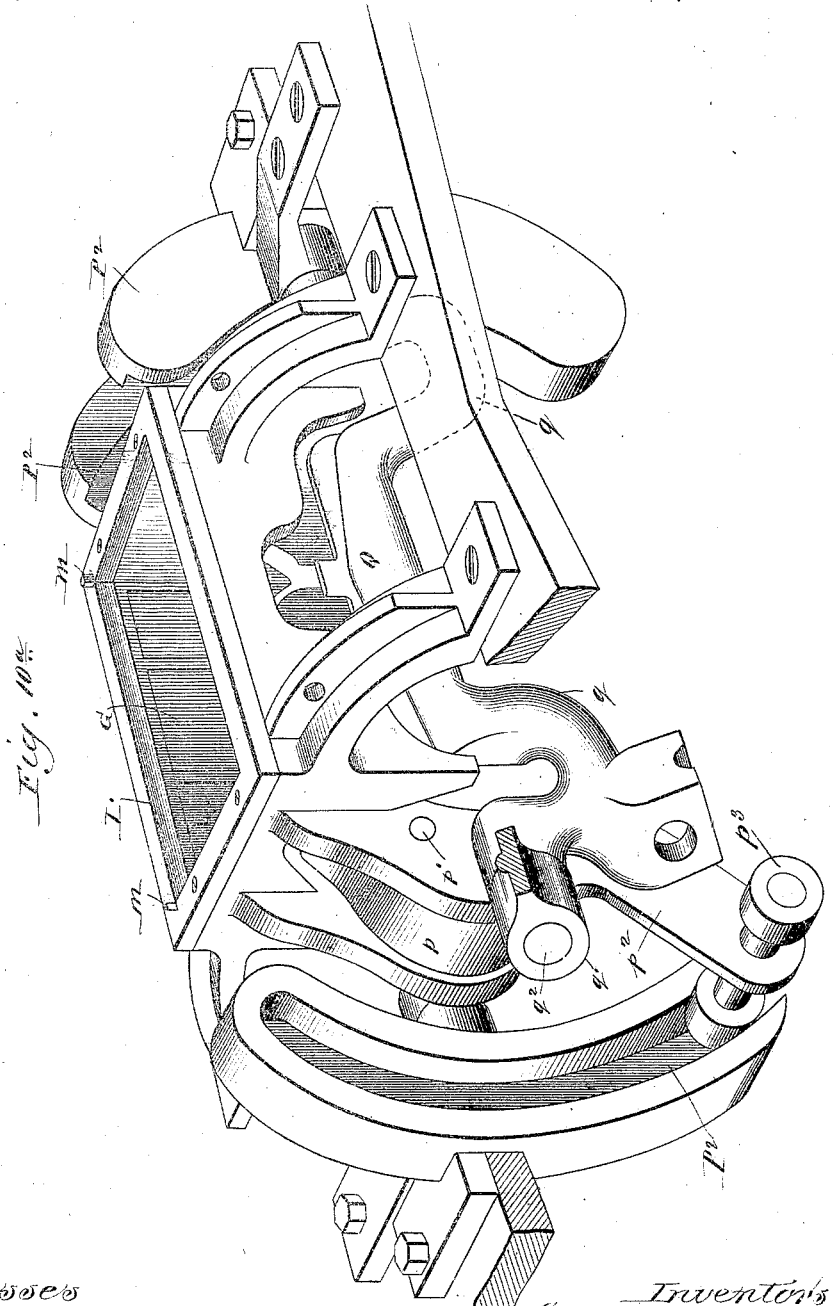
Witnesses
W. Rossiter
L. Vassall
Inventors
James R. McDonald
Timothy Stebbins
By Joseph N. Parkinson
Atty.

(No Model.) 20 Sheets—Sheet 12.

J. R. McDONALD & T. STEBBINS.
MACHINE FOR MAKING ENVELOPES.

No. 464,984. Patented Dec. 15, 1891.

Witnesses
W. Rossiter
L. Vassall

Inventors
James R. McDonald
Timothy Stebbins
By Joseph C. Parkinson
Atty.

(No Model.) 20 Sheets—Sheet 13.

J. R. McDONALD & T. STEBBINS.
MACHINE FOR MAKING ENVELOPES.

No. 464,984. Patented Dec. 15, 1891.

(No Model.) 20 Sheets—Sheet 14.
J. R. McDONALD & T. STEBBINS.
MACHINE FOR MAKING ENVELOPES.
No. 464,984. Patented Dec. 15, 1891.
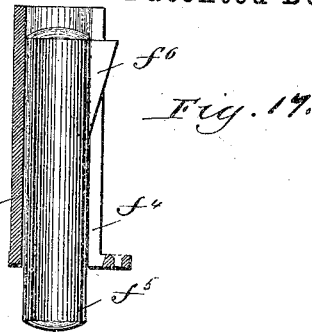
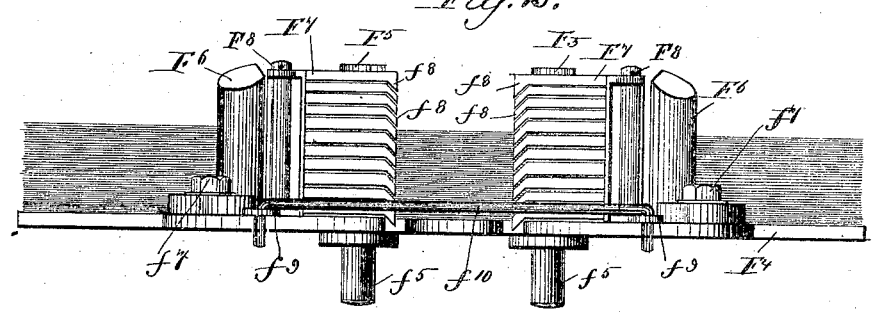
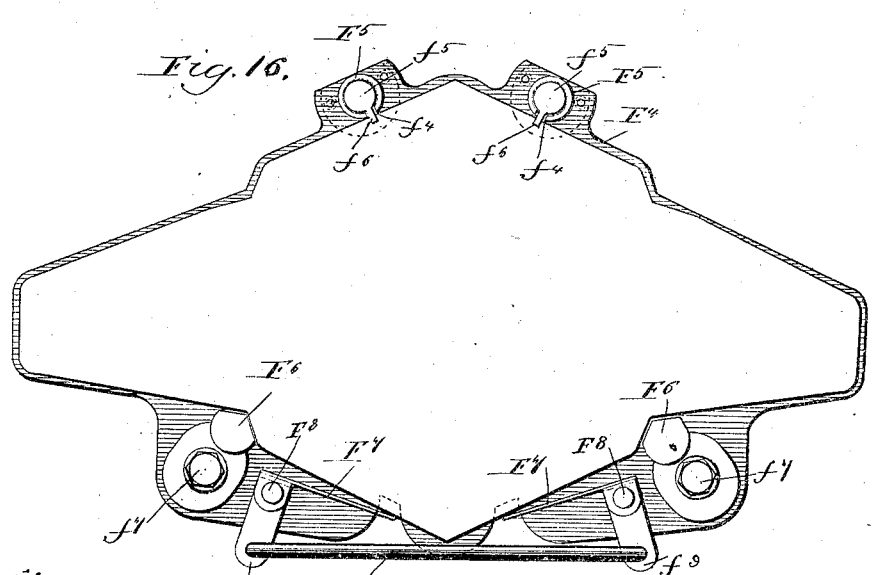
Witnesses
W. Rossiter
L. Vassall
Inventors
James R. McDonald
Timothy Stebbins
By their Atty.

(No Model.) 20 Sheets—Sheet 15.
J. R. McDONALD & T. STEBBINS.
MACHINE FOR MAKING ENVELOPES.
No. 464,984. Patented Dec. 15, 1891.
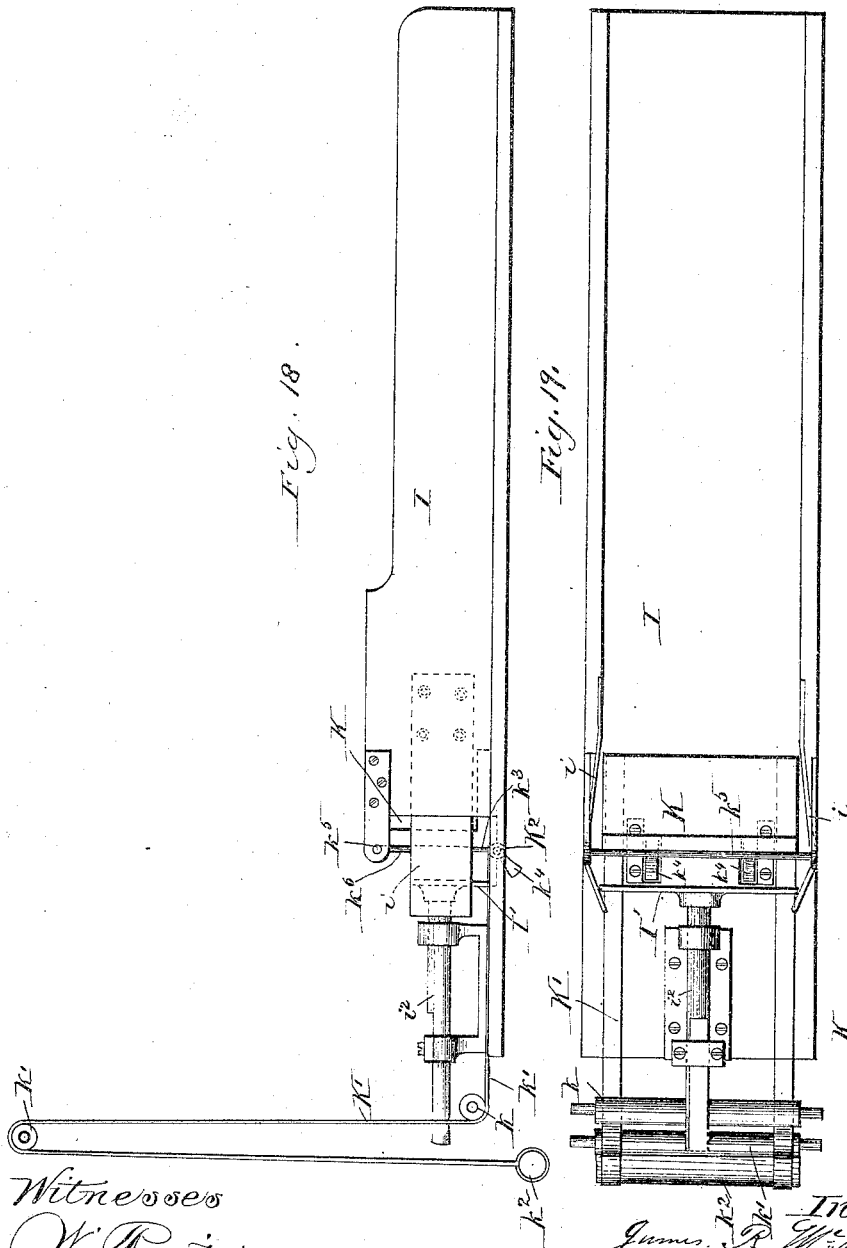

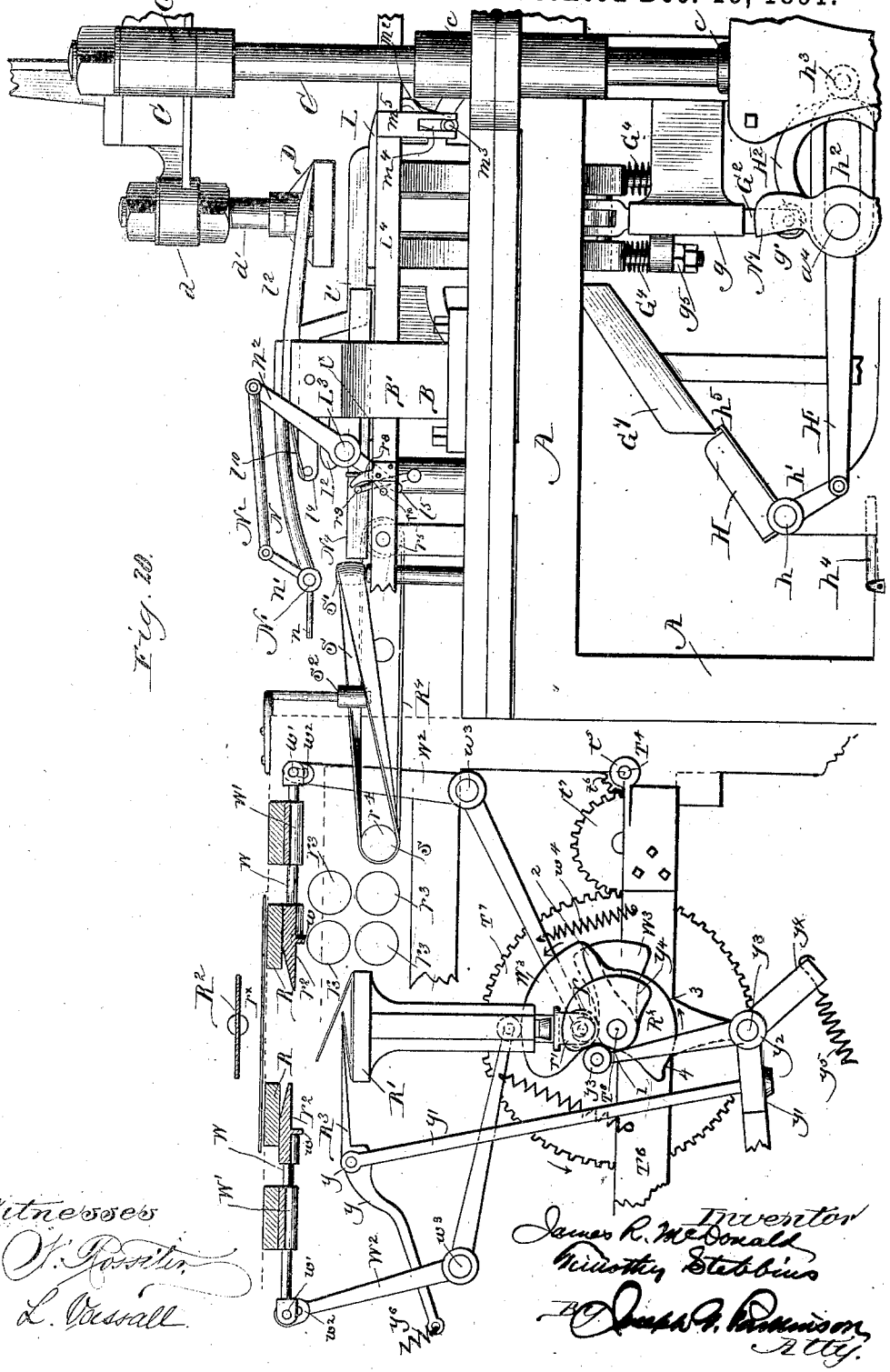
(No Model.) 20 Sheets—Sheet 16.
J. R. McDONALD & T. STEBBINS.
MACHINE FOR MAKING ENVELOPES.
No. 464,984. Patented Dec. 15, 1891.

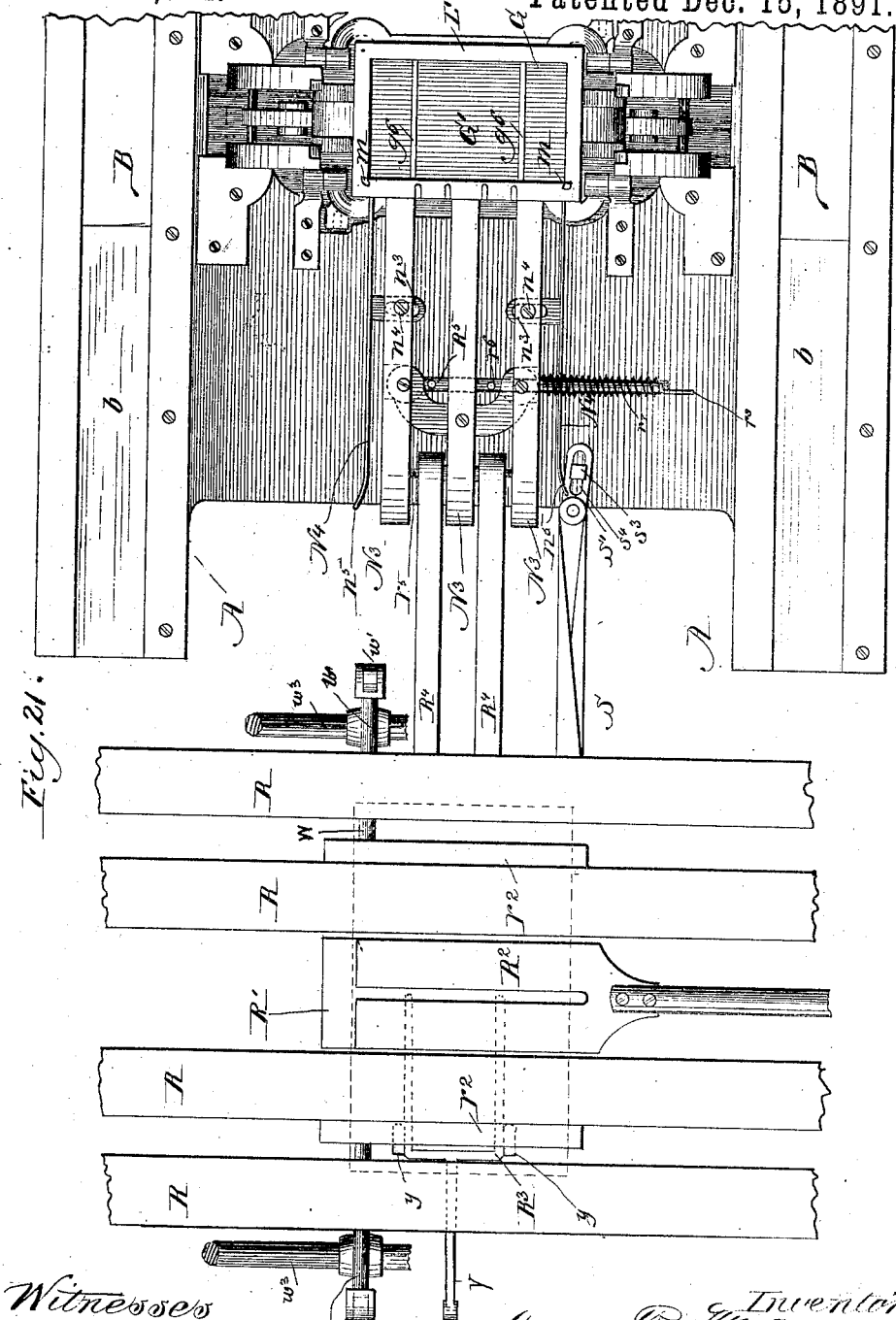

(No Model.)  20 Sheets—Sheet 18.
J. R. McDONALD & T. STEBBINS.
MACHINE FOR MAKING ENVELOPES.
No. 464,984. Patented Dec. 15, 1891.
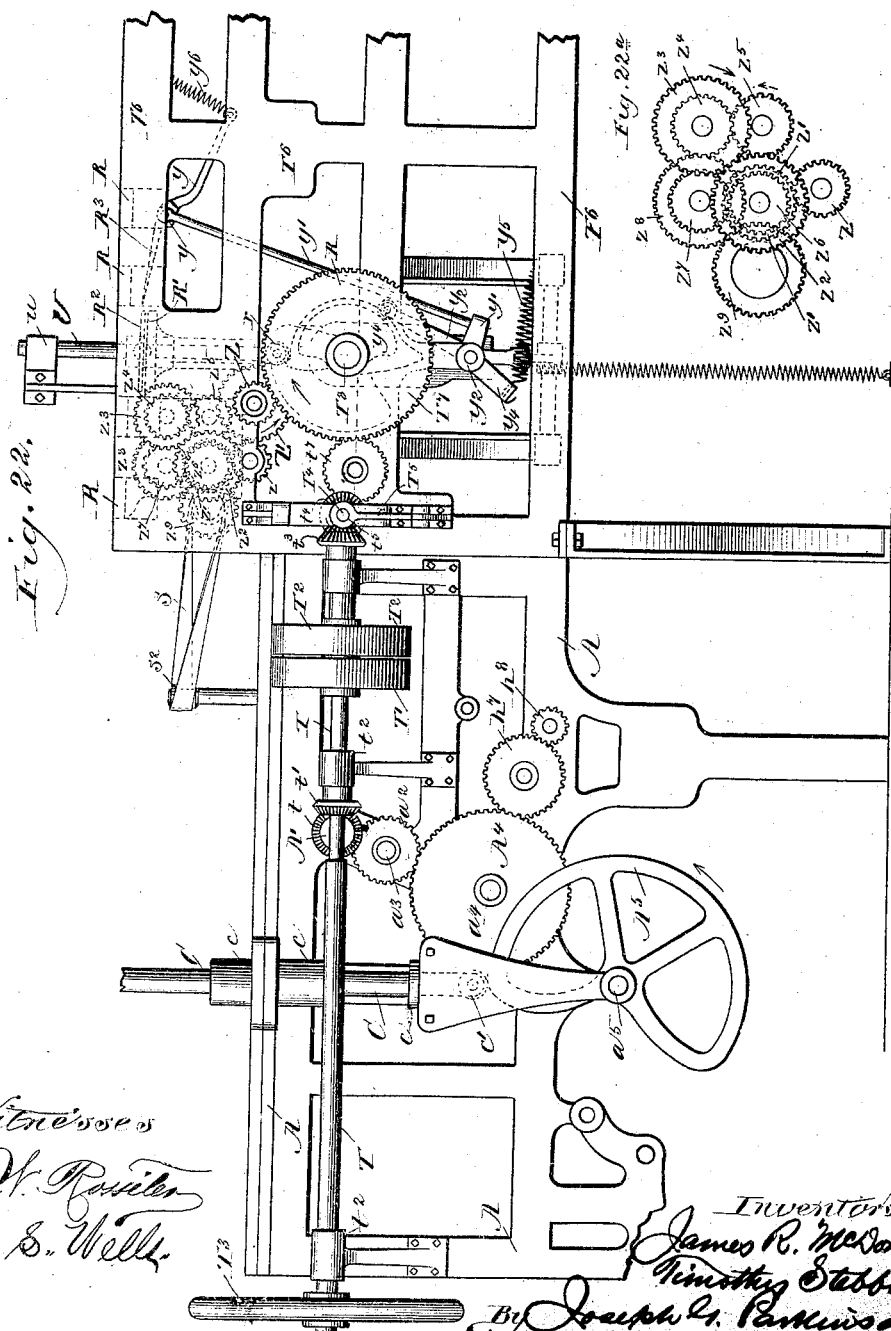

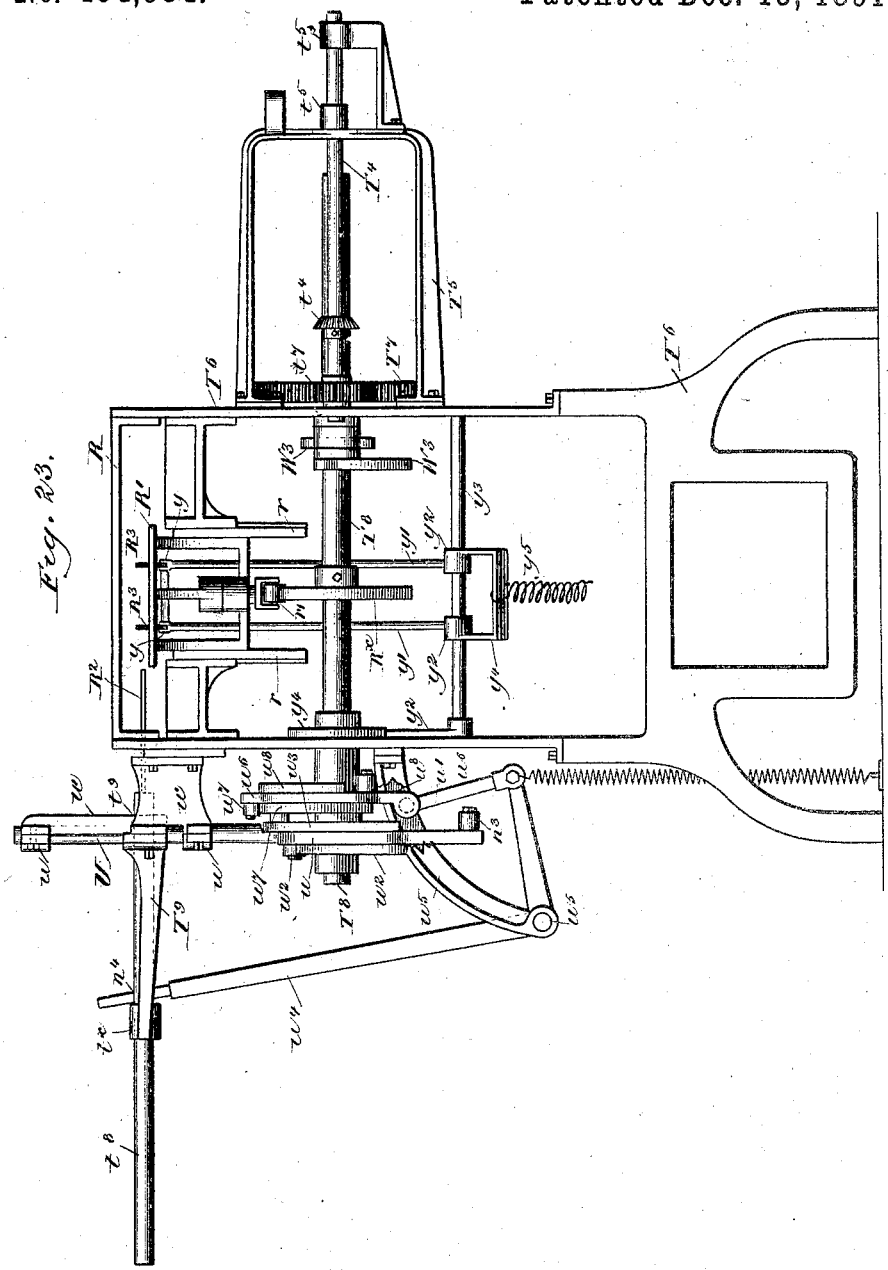

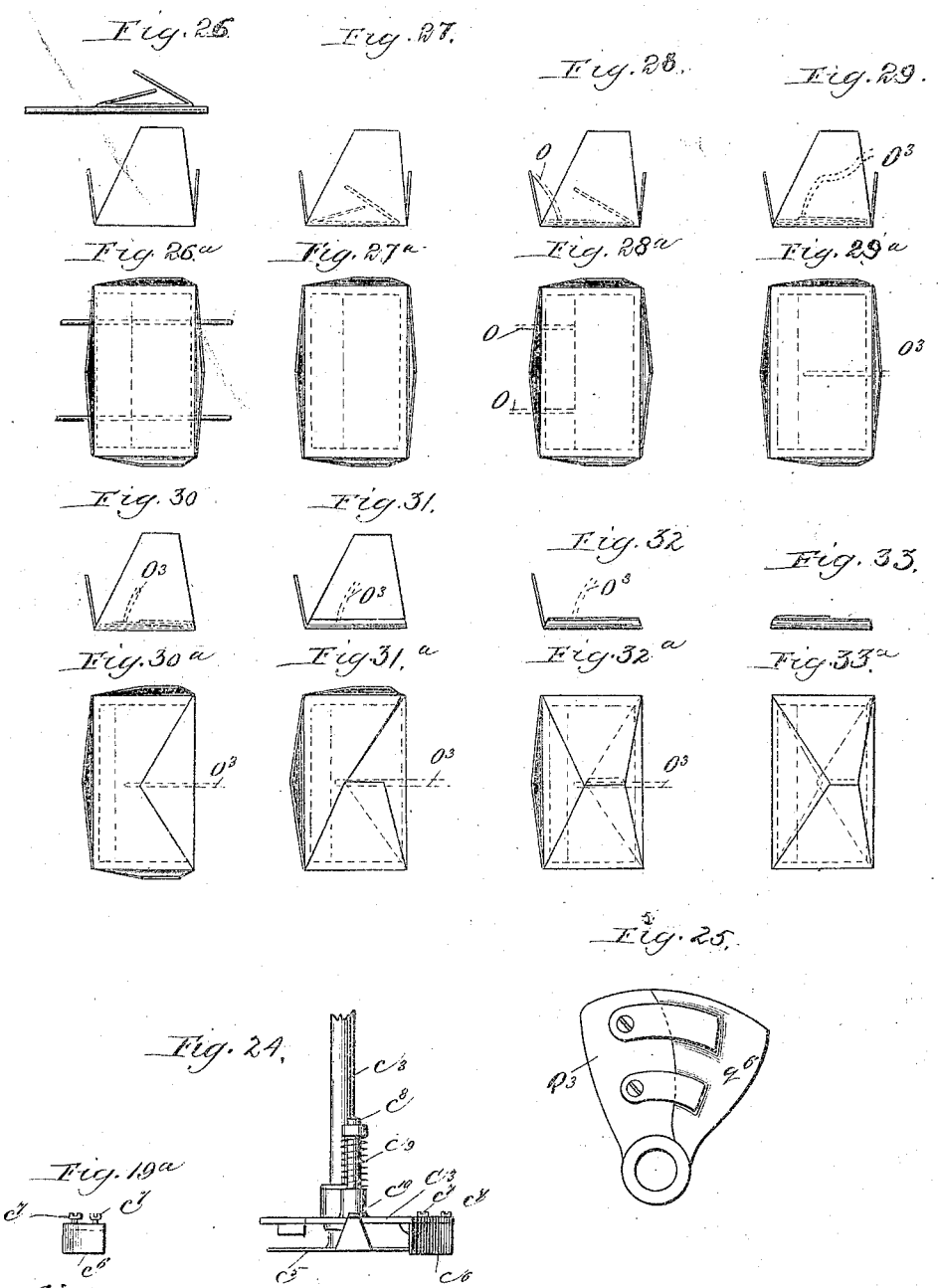

UNITED STATES PATENT OFFICE.

JAMES R. McDONALD AND TIMOTHY STEBBINS, OF CHICAGO, ILLINOIS, ASSIGNORS TO THE NATIONAL FOLDING AND ENVELOPING COMPANY, OF SAME PLACE.

MACHINE FOR MAKING ENVELOPES.

SPECIFICATION forming part of Letters Patent No. 464,984, dated December 15, 1891.

Application filed August 2, 1889. Serial No. 319,499. (No model.)

*To all whom it may concern:*

Be it known that we, JAMES R. McDONALD and TIMOTHY STEBBINS, citizens of the United States, residing at Chicago, in the county of Cook and State of Illinois, have invented certain new and useful Improvements in Machines for Making Envelopes and Placing Inclosures Therein, of which the following is a specification.

The object of our invention is to gum and fold an envelope from a previously-prepared blank upon which a business-address or return-address, or both, may have been previously printed, and to inclose within such envelope while in the process of forming it one or more circulars, manifold letters, or other material intended for the mail; and to this end we combine with a gum-box or reservoir and a holder for a stack of envelope-blanks a picker for removing a single blank at a time from the stack and applying gum thereto, devices for conveying the envelope to the forming or folding box and for giving the initial crease thereto, an intermittent carrier or feeder whereby circulars or other material are delivered to the partially-formed envelope, stops or cut-offs which regulate the delivery of such circular, and folding devices whereby the flaps of the envelopes are pasted down upon each other and secured after the circulars have been received.

Although the primary feature of our invention consists in combining with any suitable mechanism for gumming, creasing, and folding envelopes devices whereby folded material for inclosures is carried to and deposited within the partially-formed envelope at the proper intervals, yet in carrying out our idea to its full fruition we have introduced various novel and useful improvements into the envelope mechanism itself which may or may not be used independently of or in connection with said devices for delivering inclosures, as will appear from the ensuing description.

In an application filed by us in the Patent Office of the United States on the 16th day of April, 1888, Serial No. 270,870, we have described and claimed as our invention a novel machine for folding circulars and other printed material, and it is our intention to employ our present apparatus in connection with said machine, or one accomplishing the same object, and therefore for the purposes of the present description we have represented in the drawings, with slight modification, the final folding and delivery mechanism of said machine, in connection with the circular receiving, conveying, and depositing device of the present machine, without thereby intending to lay any claim herein to such folding apparatus *per se* or to the mechanism by which it is driven.

Figure 2:
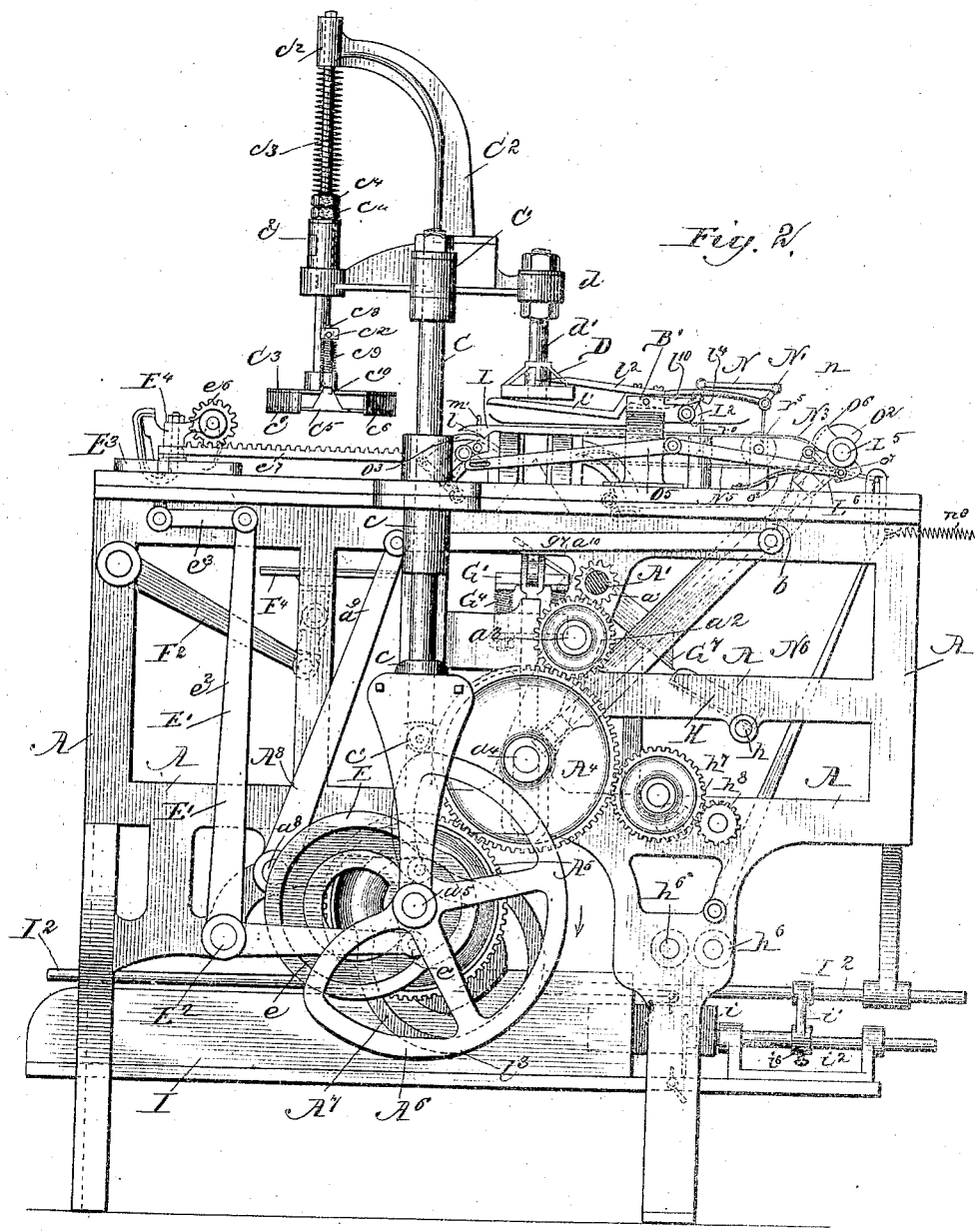
Figure 3:
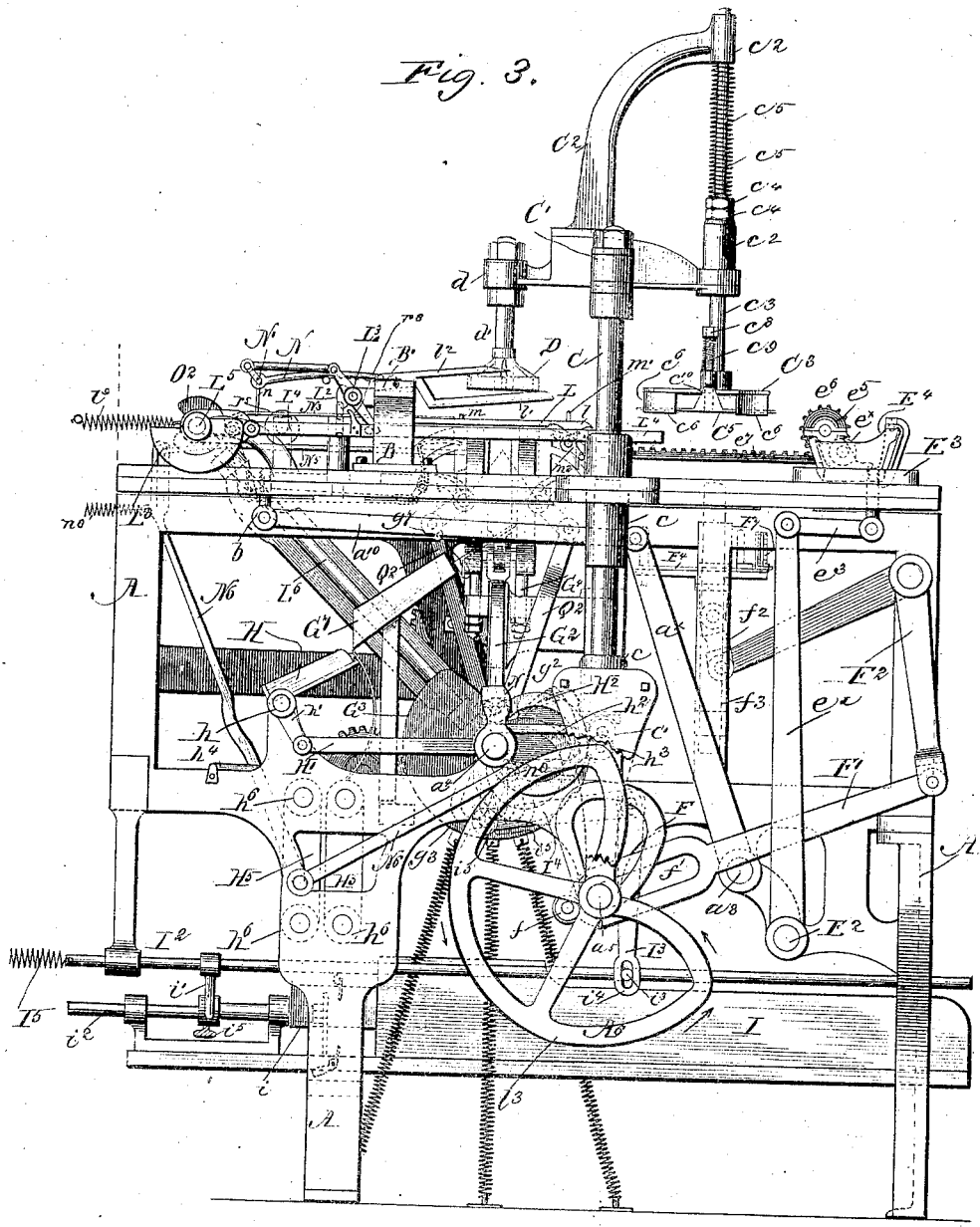
Figure 4:
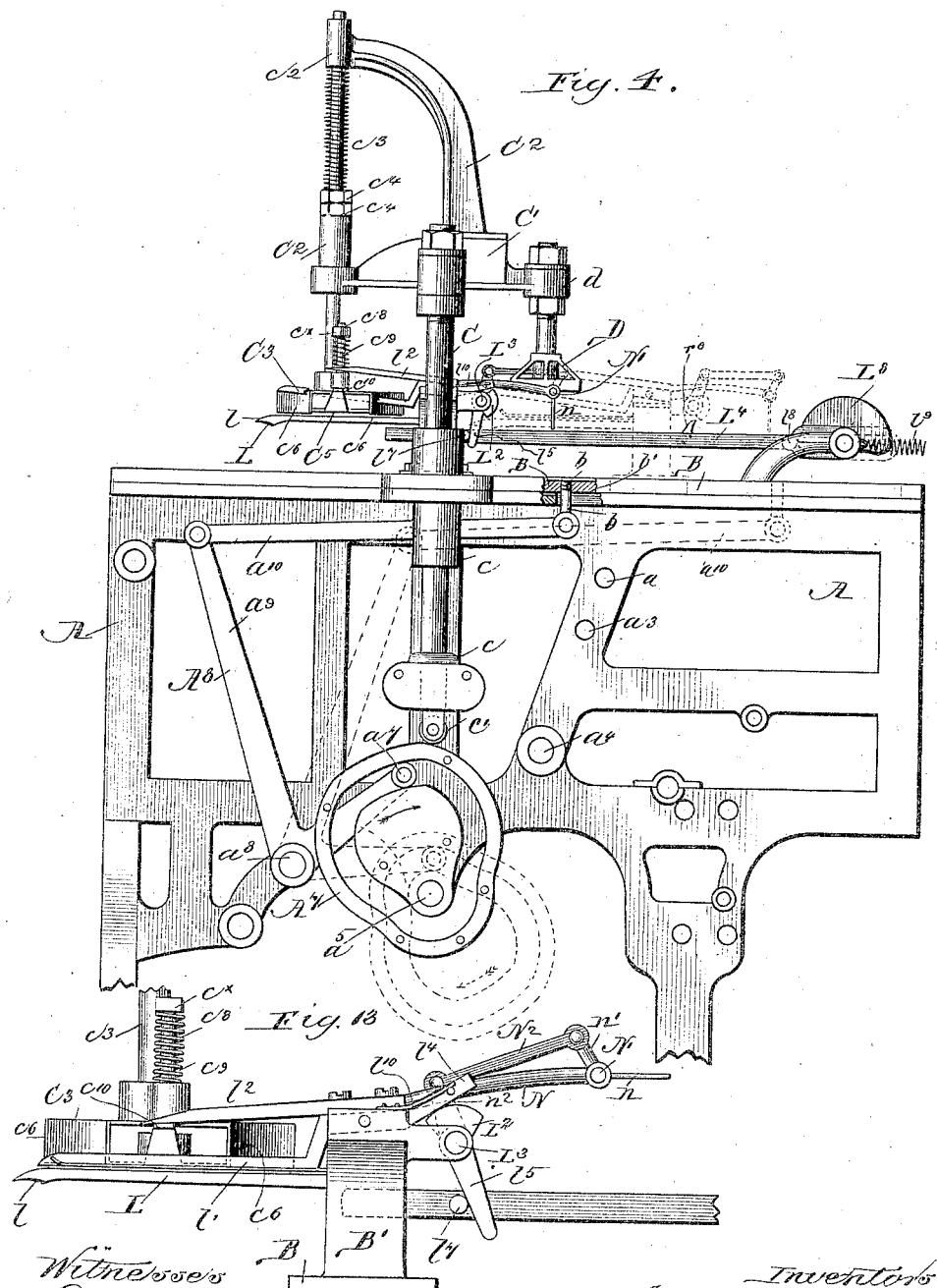
Figure 5:
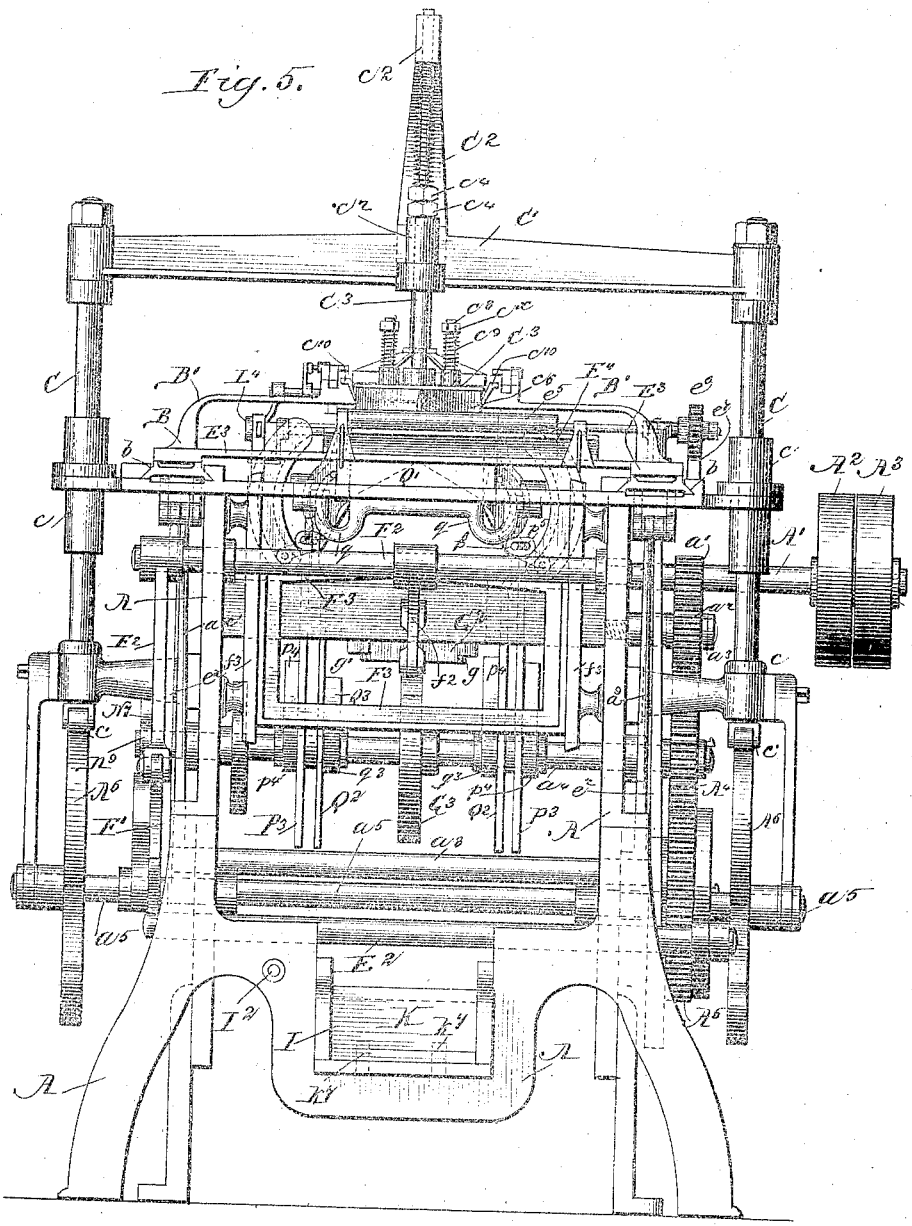
Figure 6:
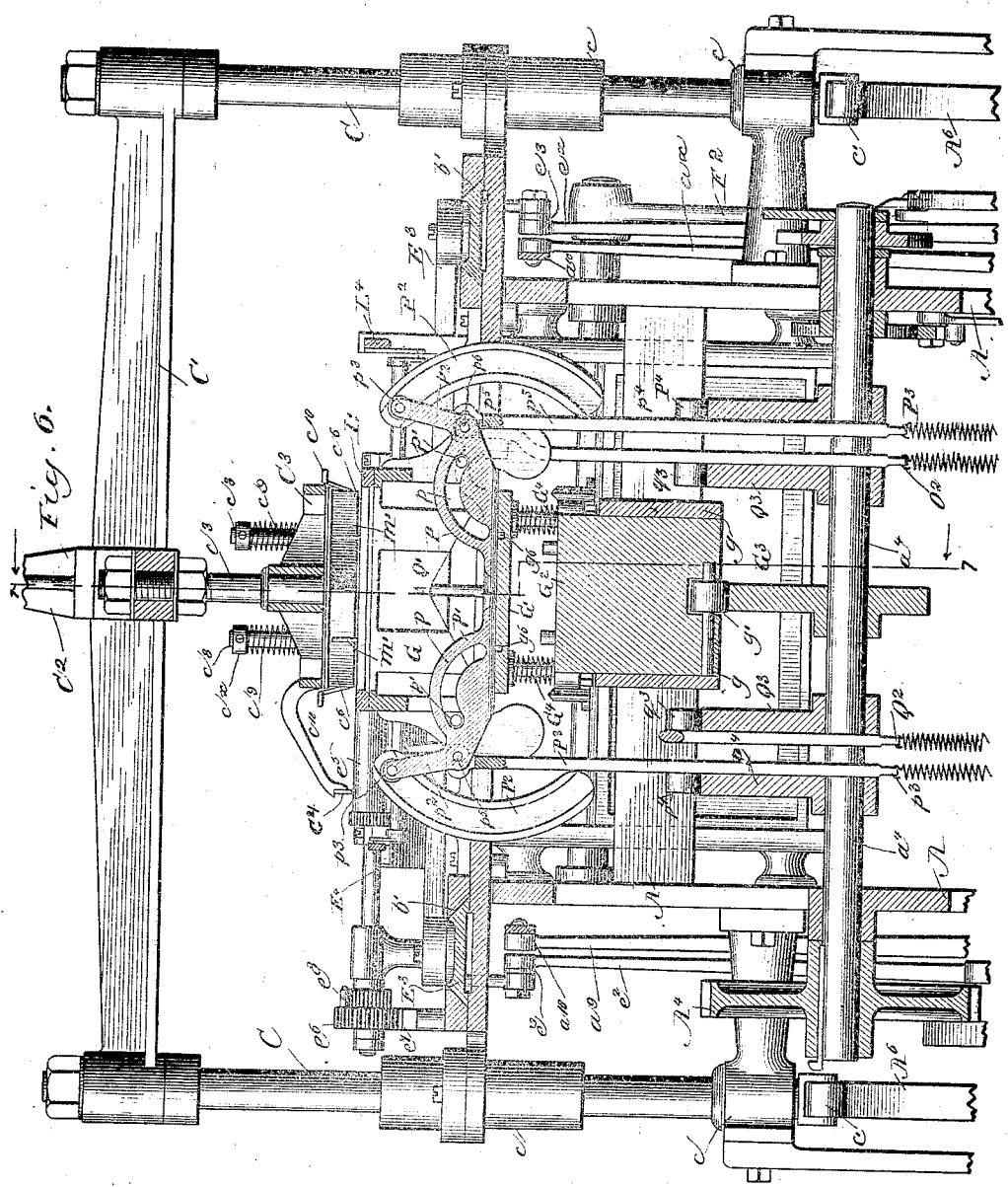
Figure 7:
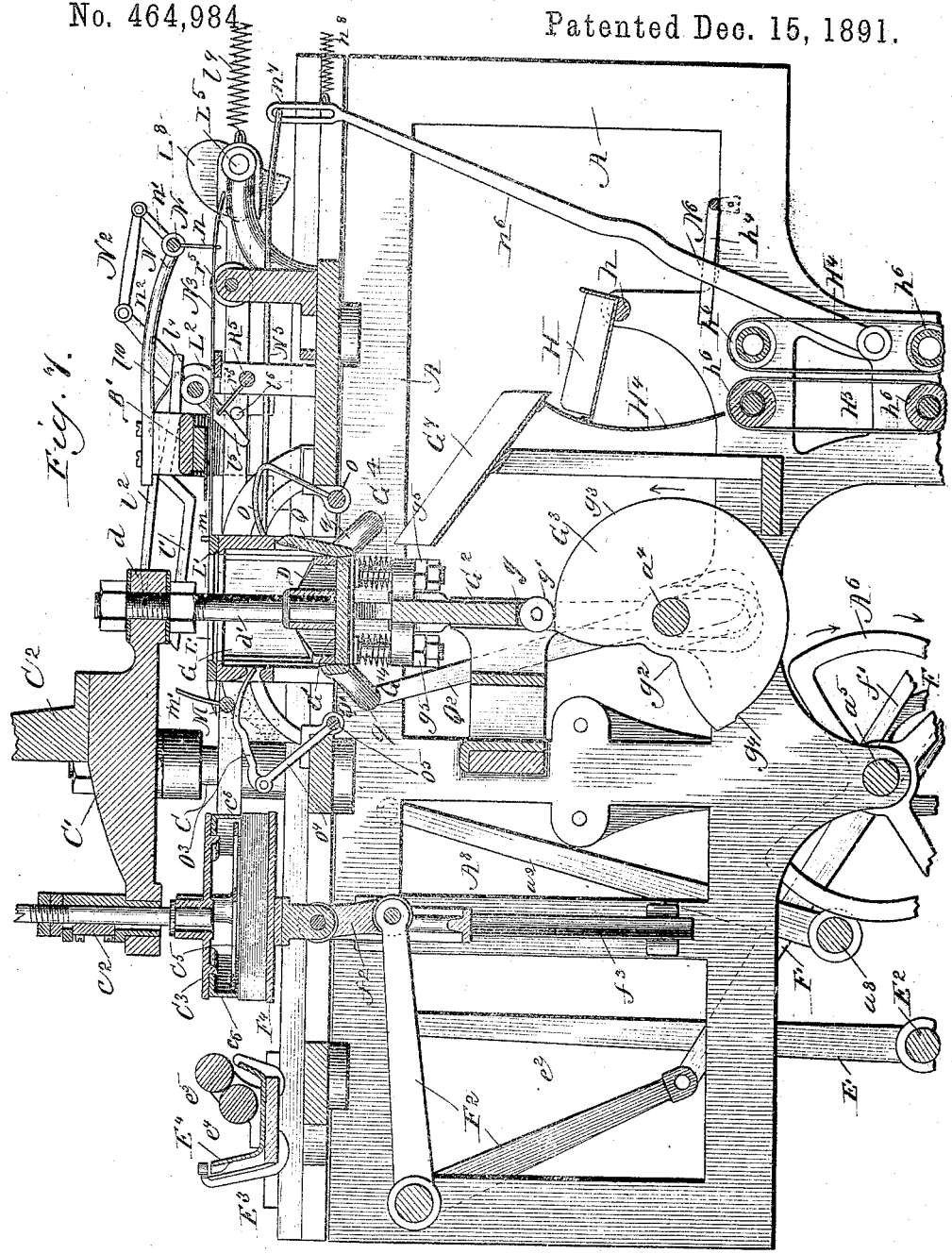
Figure 8:
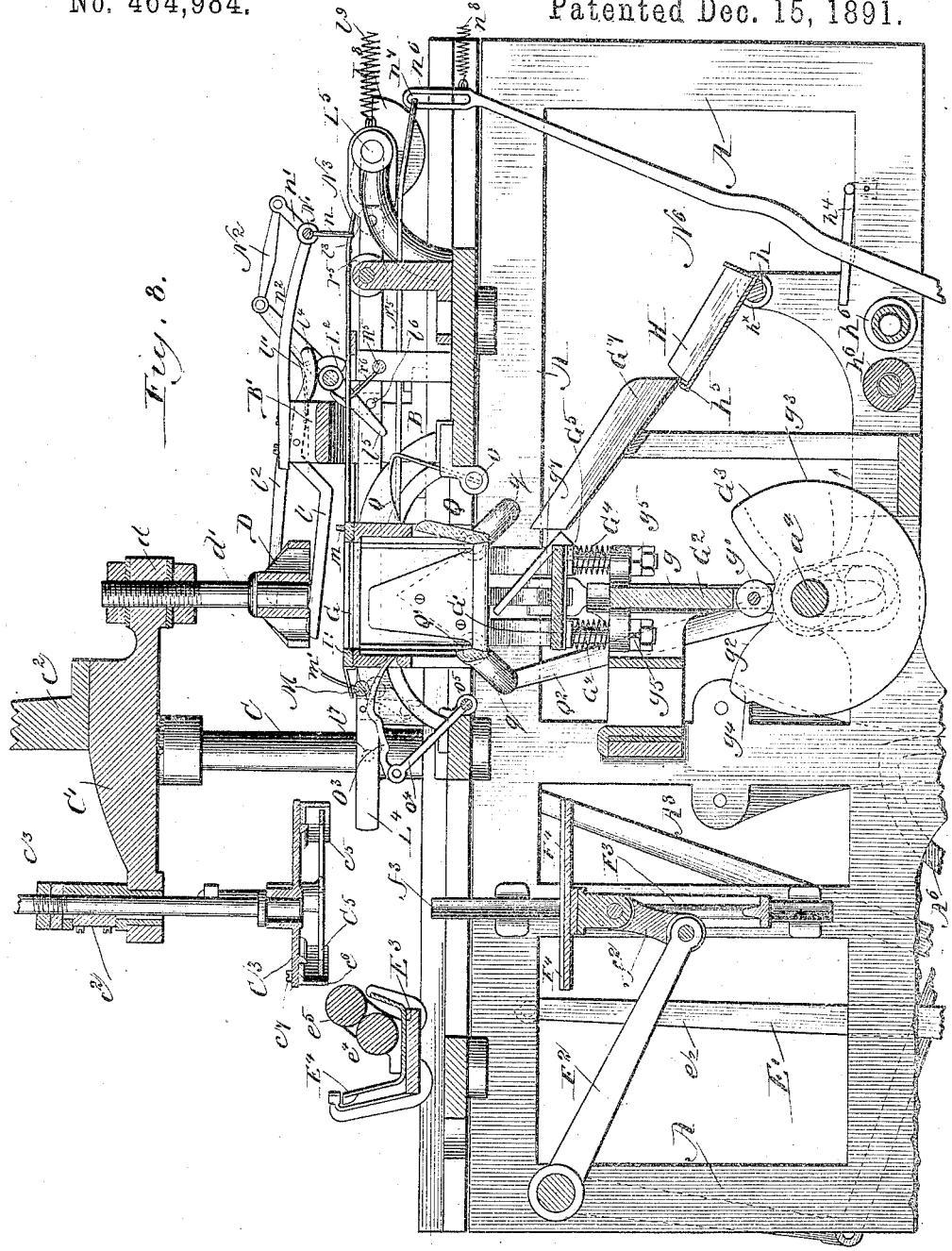
Figure 9:
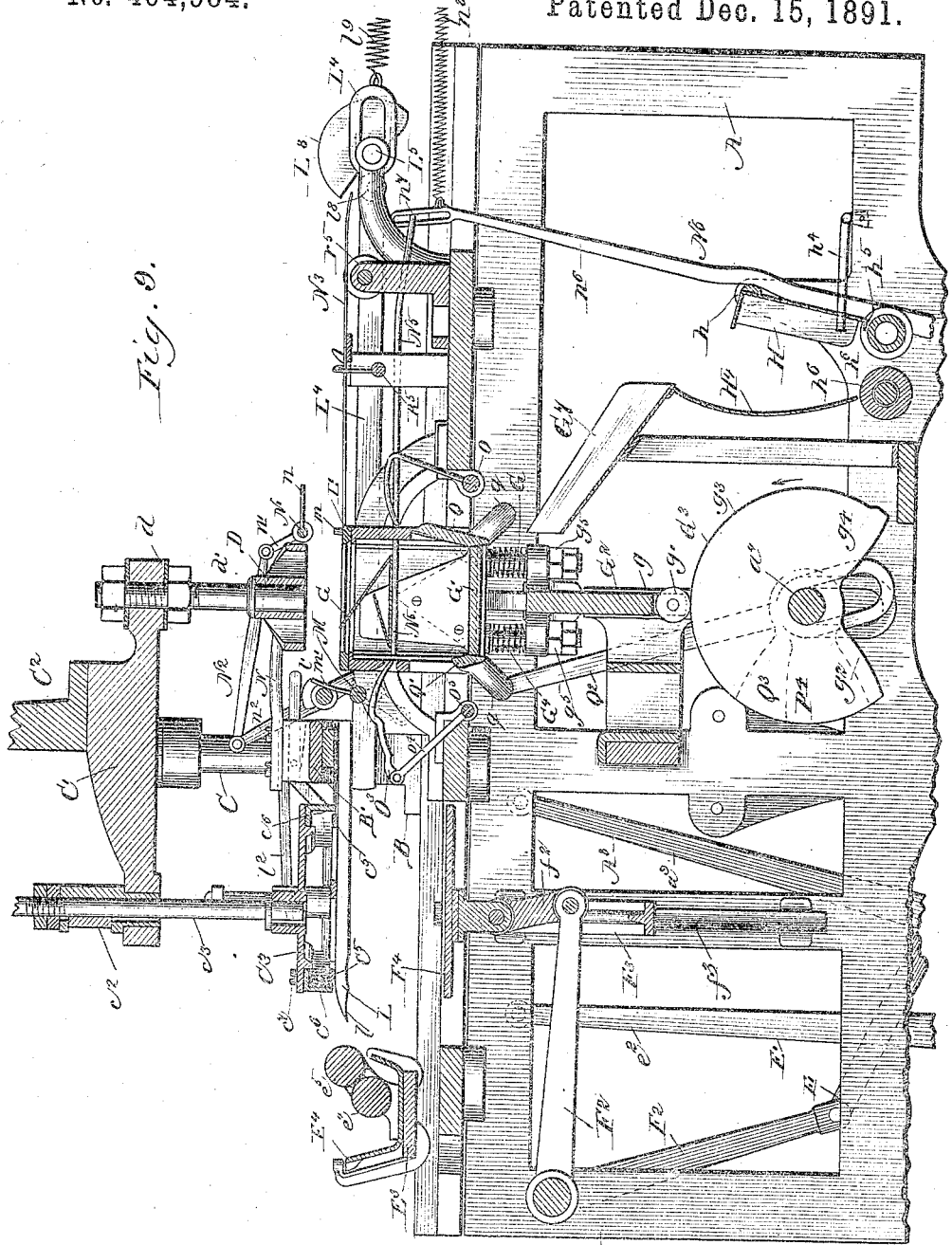
Figure 10B:
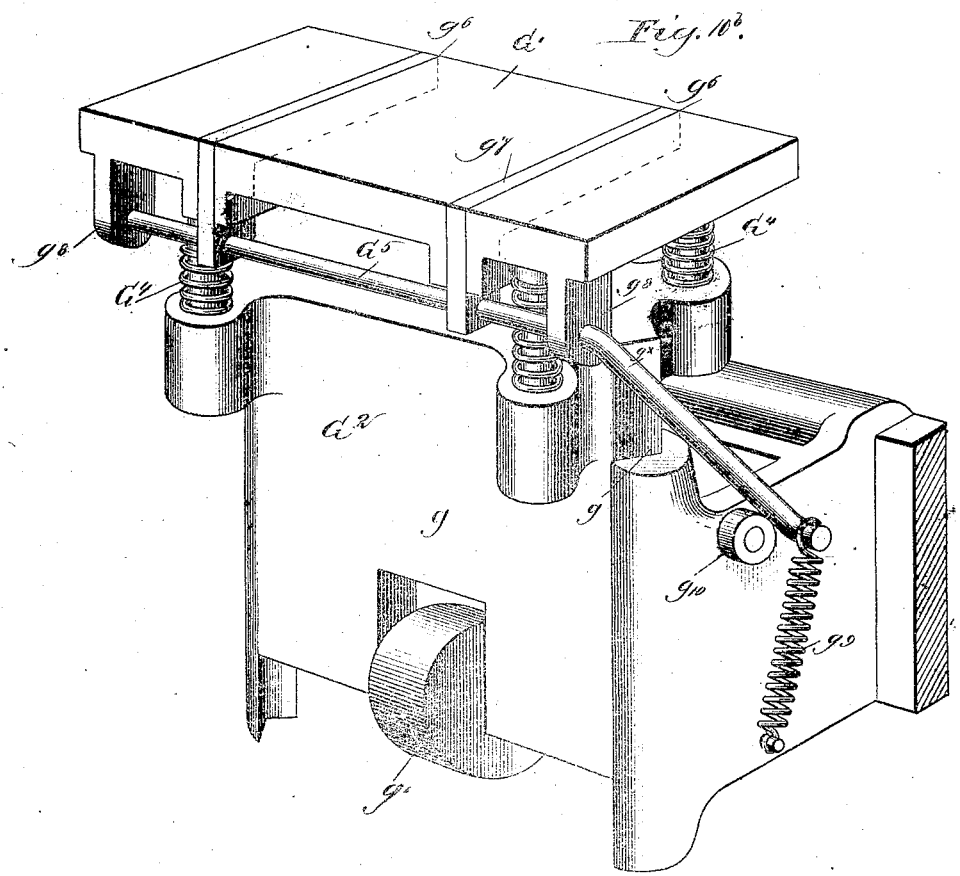
Figure 10C:
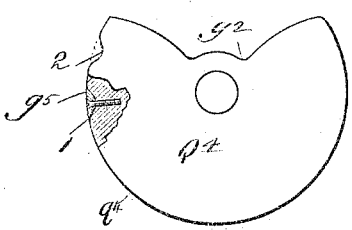
Figure 11:
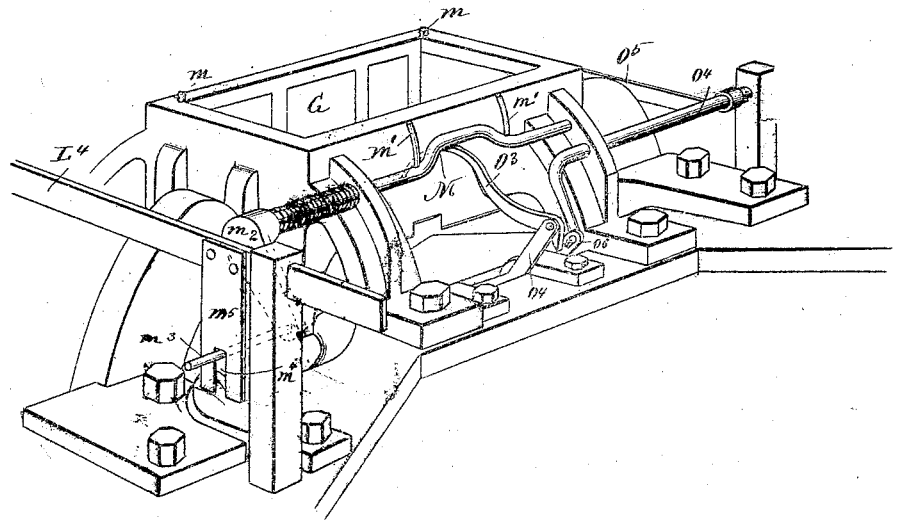
Figure 12:
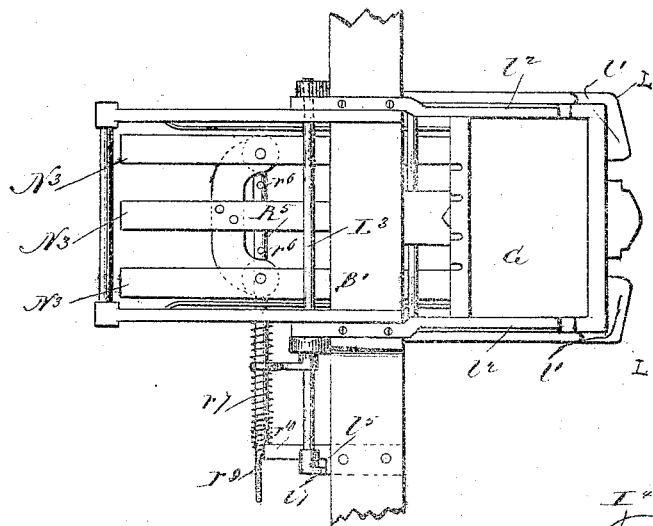
Figure 14:
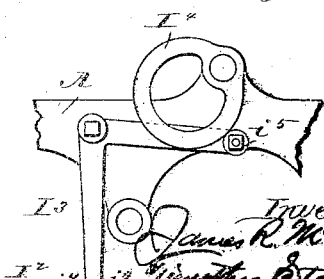

In said drawings, Figure 1 represents a top plan view of a machine embodying our invention, part of the circular feeding and conveying devices or carriers being broken away at the left hand. Fig. 2 is an elevation of said machine from the left-hand side, the carriers for circulars and such material being omitted. Fig. 3 is a side elevation from the opposite or right hand of the machine, also omitting the before-mentioned carriers. Fig. 4 is also a side elevation of the machine with the nipper-carriage advanced from the position shown in Fig. 2 and much of the mechanism omitted to more clearly expose the devices for operating said carriage. Fig. 5 is an outer end elevation of said machine; Fig. 6, a vertical transverse section through the folding-box and plunger, taken on the line 6 6 of Fig. 1 and upon an enlarged scale; Fig. 7, a vertical longitudinal section centrally through the machine, taken on the line 7 7 of the preceding figure and on the same scale, showing the picker in contact with the top blank of the stack of envelope-blanks and the plunger at the bottom of the folding-box, whither it has carried the envelope-blank delivered in the previous action of the machine after creasing it in its initial entrance into said box. Fig. 8 is a similar enlarged section on the same line as the preceding figure and from the same side of the machine and with certain of the devices for delivering the sealed envelopes omitted and with the parts in position to deposit the previously-gummed blank over the folding-box and beneath the plunger. Fig. 9 is a similar enlarged vertical longitudinal section on the same line as the preceding figure and from the same side of the machine, with parts still further advanced in action, a folded circular deposited upon a cut-off or cradle within the folding-box ready to be dropped into the previously-creased envelope at the bottom of said box whenever said cradle is withdrawn and with the blank-nippers advanced to take a fresh blank from the picker; Fig. 10, a similar enlarged vertical longitudinal section upon the same line as the three previous figures, but from the opposite side of the machine, showing a still further advance in action, the circular being deposited in the bottom of the box and its flaps being pressed down by fingers to avoid interference with the flaps of the envelope when the latter is folded down thereupon and the blank-nippers withdrawing to carry the envelope-blank previously gummed from the picker to the mouth of the folding-box. Fig. 10$^a$ is a perspective view of the folding-box detached and enlarged; Fig. 10$^b$, a perspective view of the platen, its cam, supporting-standard, and one of its guideways, showing the devices for operating the ejector-fingers in said platen; Fig. 10$^c$, a modification of the platen-cam. Fig. 11 is a detail in perspective showing the folding-box and certain accessory mechanism, including the tucking-fingers, whereby the envelope-blank is held against the stationary stops. Fig. 12 is a detail in top plan view to explain the relation of the nipper cam-shaft and of the cut-off in the passage-way for the folded material to their respective stops on the carriage-bridge; Fig. 13, Sheet 4, an enlarged detail of the raking device whereby the circular is taken from its conveyer and delivered to the folding-box; Fig. 14, Sheet 13, a detail showing the cam on the platen-shaft and intermediate mechanism whereby it operates the plunger in the packing-box. Fig. 15 is a side elevation, and Fig. 16 a top plan view, of the holder for the stack of envelope-blanks; Fig. 17, a detail of one of the posts of said holder, showing the sliding finger whereby the blanks are separated from each other and only one at a time taken by the picker. Fig. 18 represents in side elevation, and Fig. 19 in top plan view, the packing devices whereby the folded envelopes, with their inclosures, are arranged in order for bundling or for being packed away in boxes. Figs. 19$^a$ and 24 represent details of the picker. Fig. 20 is a side elevation of a portion of the machine with a part of the circular folding and delivery mechanism shown in section, and with the intermediate feeding and cut-off devices which convey the circular from said folding mechanism to the envelope-box. Fig. 21 is a top plan view of the mechanism shown in the preceding figure, but with the plunger omitted; Fig. 22, a side elevation of so much of the machine as is sufficient to illustrate an arrangement of gearing for driving and timing the envelope-forming and circular-folding devices concurrently; Fig. 22$^a$, an enlarged detail view of the train for driving the squeezing-rollers and conveyer-belts; Fig. 23, a vertical transverse section through the circular-folding apparatus seen from the direction of the enveloping devices; Fig. 25 on Sheet 20 is an adjustable cam whereby the operation of the folders is controlled or varied in such manner that the fly or seal flap of the envelope shall either be sealed to the outer side or be turned in under the other flaps when it is left ungummed; Figs. 26 and 26$^a$ to 33 and 33$^a$, a diagrammatic series representing the successive positions of and operations upon the envelope and its inclosures from the time the latter are deposited upon the cradle until the envelope is finally sealed and ready for mailing.

A represents a strong frame, advisably of iron or steel, and for lightness made of skeleton outline with sills and girts for the support of the various bearings of the machine, and A' is the main driving-shaft, having fast and loose pulleys A$^2$ A$^3$ and turning in a bearing $a$ in said frame. Upon this shaft is keyed a driving-pinion $a'$, that directly meshes with an idle-gear $a^2$, mounted on a stub-axle $a^3$, and in its turn driving a gear A$^4$, which revolves a through-shaft $a^4$, extending from side to side of the machine and bearing cams, as presently explained. The gear A$^4$ engages with and drives another gear A$^5$, also fixed to a through-shaft $a^5$, and bearing at one or both ends, preferably at both, cams A$^6$, hereinafter termed the "plunger cam" or "cams," of practically the outline shown, whereby the frame carrying the picker and plunger is raised vertically at the proper times and at the proper relative speed and permitted to descend by gravity at times according with the actions of other parts of the mechanism. Said through-shaft has also at one end another cam A$^7$, having a slotted or grooved track, in which travels an anti-friction roll $a^7$, borne upon the end of one arm of an elbow-lever A$^8$, keyed to a through-shaft $a^8$, carrying at the opposite side of the machine a lever-arm $a^x$, corresponding in length and parallel with the lever-arm $a^9$ of said elbow-lever, and the upper ends of these two lever-arms are connected by links $a^{10}$ with pins $b$ from a carriage B, reciprocating in ways $b'$ upon the upper plane surface of the frame and having a bridge B', carrying the nippers for the blank and a rake for the circulars and certain other accessories, all as will be hereinafter explained, and for the purpose of reference this carriage may be called the "nipper-carriage," and the cam by which it is actuated and given its to-and-fro movements may be called the "nipper-carriage cam."

The plunger-frame consists of two vertical rods C, sliding in ways $c$ at each side of the frame, and at their lower ends having anti-friction rolls $c'$, which rest upon the periphery of the plunger-cams, so that the revolutions of the latter may lift the rods to allow them to sink, depending upon whether they are traveling upon a spiral or concentric portion of said cam or sinking into the cut-away portion. At their upper ends these rods are united by a strong cross-head C', which has an ascending bracket C² overhung toward the outer end of the machine, and in the end of this bracket and also vertically beneath are formed sleeves or guides $c^2$ for the spindle $c^3$ of the picker C³, whereby the blanks are gummed and lifted. This spindle is adjustable by nuts $c^4$, resting upon the upper end of the lower sleeve, and is urged down by a coiled spring $c^5$, seated at one end against the nuts and at the other end against the upper bearing or guide.

The picker itself is of the usual outline, with downwardly-projecting flanges $c^6$, the edges of which receive the gum for the back flap and the seal-flap of the envelope, and a foot C⁴ to gum one of the side flaps; but the flange for the seal-flap is made detachable, so that said flap may be left ungummed when desired—that is to say, said flange is secured to the picker by screws $c^7$, as shown in Figs. 9 and 19, so that it may at any time be removed. Inside of these gumming-flanges is located a stripper-plate C⁵, substantially conforming to their outline, but normally held above the plane of the gumming-edges by means of pins $c^8$ and coiled springs $c^9$, the stress of which may be adjusted by nuts $c^x$ upon said pins. At the sides where the picker is open to avoid gumming the side flaps of the envelope the stripper-plate is bent up and then horizontally to form ears $c^{10}$, projecting beyond the picker, which ears afford a purchase for depressing-fingers, presently to be described, whereby at the proper moment the stripper and picker depart relatively from each other to press the blank away from the picker and detach it therefrom to be grasped by the jaws of the nippers. The cross-head is also opposite the sleeves for the picker-spindle—that is to say, toward the inner end of the machine—provided with a boss $d$, in which is secured the shank $d'$ of the creasing-plunger D, so that whenever the plunger-frame descends said plunger may be carried positively downward, while, on the other hand, the picker will descend positively only until it meets an obstruction, when the spring coiled about its spindle will permit it to yield. The creasing-plunger does not differ essentially, or need not differ essentially, from those heretofore in use, and needs no further detailed description, except such as may hereinafter relate to its co-operation with the folding-box and other mechanism.

Besides the cams already described, the plunger-shaft carries still two others, the first of which, alongside the nipper-carriage cam and indicated by the letter E, has a cam-groove $e$, in which runs an anti-friction roll $e'$ on a short arm of an elbow-lever E', keyed to a through-shaft E², which bears at the other end a lever-arm $e^x$, corresponding with the longer arm $e^2$ of said elbow-lever, and the upper ends of these two arms are connected by links $e^3$ with pins depending from a second sliding carriage E³, which moves or may move in continuations of the same ways $b$ on the upper plane surface of the frame that the other does, and which carries the gum-box E⁴ and gum-rolls, and is reciprocated back and forth underneath the picker in order to apply gum to the gumming-edges of the latter. The gum-box has two or more gumming-rolls $e^4$ $e^5$ in frictional contact, the upper one of which has at one end a spur-pinion $e^6$, that meshes with a rack $e^7$, fixed to the frame parallel with the ways in which the carriage reciprocates, and is provided with a backing-ratchet or one-way clutch $e^8$ to drive said upper roll in one direction only, whereby the rolls are revolved with the reciprocations of the carriage away from the picker and the gum properly distributed and delivered to the upper roll, but remain stationary as the carriage moves toward and passes beneath the picker, except so far as they may be turned by frictional contact with its edges. For convenience of designation hereinafter this second carriage will be termed the "gum-carriage" and the cam by which it is driven the "gum-cam." Finally, the plunger-shaft carries at the opposite side of the frame from the gum-cam a pear-shaped peripheral cam F, which engages with an anti-friction roll $f$ on the end of a pitman F', slotted, as at $f'$, to take over the plunger-shaft. This pitman connects with one arm of a bell-crank lever F², the other arm being connected by a link $f^2$ with a frame F³, reciprocating in vertical ways $f^3$ and carrying the blank-table F⁴, located directly beneath the picker, and the operation of the plunger-cams and of what may be termed the "table-cam" is such that when the picker descends upon the pile of blanks carried by the table and commences to reascend the table, which has already partly met it in its downward journey, follows it up, but at a gradually slower speed, so that the separation of the two may be by degrees, and thus insure more certainly the picking of out a single blank from the pile, after which the table is withdrawn to be again carried up against and along with the picker.

The blank-table is constructed with two stationary hollow posts F⁵, vertically slotted, as at $f^4$, and receiving within them weight-spindles $f^5$, having at their upper ends inclined or beveled spurs $f^6$, projecting through the slots, the purpose of which is to still further insure the separation of but a single blank from the pile whenever the picker rises by dividing such blank from the one beneath. These hollow posts form stops for and are in contact with the edge of the back flap of the blanks, while at the opposite side of the blanks and located at the re-entrant angles between the seal-flap and side flap are posts F⁶, having bevel-faces and secured to the plate by suitable clamping-bolts $f^7$, whereby they may be adjusted. The edges of the seal-flaps are pressed upon, so as to carry the whole stack against the stationary hollow posts, by spring-gates $F^7$, composed of a series of flat fingers $f^8$, which may be slotted out from a single sheet and are turned downward at their adjacent ends to prevent the blanks from catching in the slots. These gates swing upon pivot-pins $F^8$ and have heel projections $f^9$, which are connected by a removable hook-link $f^{10}$, so that they may be opened for the insertion of the fresh stack of blanks and then swung in against said stack and secured in position by replacing the link. The gates, however, may be omitted, and a second pair of slotted hollow posts, with weight-spindles and dividing-spurs, substituted therefor.

Heretofore it has been customary to place posts carrying dividing-spurs at the re-entering angles between the seal or back flaps and the side flaps, so that the spurs would act at these angles upon the ends of the gummed edge of the back flap, the adjacent edges of the side flaps being ungummed, and therefore it followed that with the re-enforcement of the weight of these ungummed side flaps the spurs would tend to strip or peel the gummed edges of such seal or back flaps from the picker; but by placing the posts and spurs in contact with the gummed edges of said flaps at points along their length and on both sides of and equidistant from their center this tendency is now counteracted.

G represents the folding-box, located beneath the plunger and in outline resembling those heretofore in use. Its bottom is normally closed by a platen $G'$, which is connected with a standard $G^2$, sliding in vertical ways $g$ and having at its lower end an anti-friction roll $g'$, traveling upon a peripheral cam $G^3$, revolved by the before-mentioned shaft $a^4$, which may be termed the "platen-shaft," and is driven by the gear-wheel $A^4$, that meshes with and drives the gear upon the plunger shaft and is intermediate in the train between said latter gear and the prime pinion. This cam has a cut-away portion $g^2$, into which the roller sinks when the platen is withdrawn from the bottom of the folding-box and out of which it rises in the continued revolution of the cam when said platen is to be lifted up to again close the bottom of the box. The cut-away part of the cam is succeeded by a concentric reach $g^3$, by which the platen is held stationary when the plunger descends and while the folding wings or lappers are operating. Finally, adjacent to its return to the cut-away portion this reach is or may be succeeded by a sharp and short rise $g^4$, which lifts the platen up against the folding wings or lappers momently in order to give an additional squeeze to the envelope and its contents to insure perfect sealing. To permit the necessary yielding of the platen, its connection with the standard is by means of spring-encircled rods $G^4$, which play through ears on said standards and at their lower screw-threaded ends receive nuts $g^5$, whereby the normal height of the platen can be adjusted.

The platen is transversely grooved, as at $g^6$, to receive ejector-fingers $g^7$, secured to a rock-shaft $G^5$, taking bearing in lugs $g^8$ at one side of and beneath said platen, and a crank-arm $g^\times$ from one end of this rock-shaft is connected by a spring $g^9$ with the frame, so as to hold the ejector-fingers down in their grooves whenever the platen is elevated; but when it descends this crank-arm strikes a stop $g^{10}$ on the frame and the fingers are thrown up, (see Figs. 2 to 8,) so as to discharge the folded envelope, with its contents, into a chute $G^7$, which leads to a dumping or depositing box H, mounted upon a rock-shaft $h$, that is vibrated for each folding operation by means of a crank-arm $h'$ and a link $H'$, slotted at its end, as at $h^2$, to take over the platen-shaft and beyond the slot having an anti-friction roll $h^3$, which travels upon a cam $H^2$, mounted on the platen-shaft, whereby the dumping-box is held up with its free end just beneath the tail of the chute or returned to such position after discharging its load, but is allowed to tilt by gravity or by the force of a spring $h^\times$, coiled about its shaft and bearing at one end against a pin thereon and at the other against the frame whenever the periphery of the cam departs from the roller.

In the tilting movement stationary ejector-fingers $h^4$, fixed to the frame, pass through slots in the bottom of the box and clear the envelope therefrom. Fingers or extensions $h^5$ of the floor of the box also pass between the pulleys at the head of the adjacent set of belts, so as to make a clean delivery thereto.

A concave shield $H^4$ extends from the tail of the chute downward concentric, or nearly so, with the axis of the dumping-box to two sets of vertical parallel endless aprons $H^5$, having their contiguous faces set close together and mounted upon drums or pulleys $h^6$ at their upper and lower ends, one of the upper drums being driven from the gear-wheel on the platen-shaft by means of an idle-wheel $h^7$ and a spur-pinion $h^8$, while the other may be either driven positively by suitable intermeshing gear $h^9$ or by the friction of bodies passing through. At the lower ends these aprons deliver or discharge the envelopes between the flaring wings $i$ of a packing-box I and into a narrow space inclosed on one side by a follower $I'$, operated intermittently in one direction by a connection $i'$ between its shank $i^2$ and a sliding rod $I^2$, which is reciprocated through the instrumentality of an elbow-lever $I^3$, receiving a pin $i^3$ from said rod in a yoke $i^4$ at its lower end, and a roller $i^5$, riding upon a cam $I^4$ on the platen-shaft, the movement in the other direction (or return movement) being accomplished by a spring $I^5$, connecting either the lever or one of the sliding parts with the frame. As the follower may need adjustment, its connection with the sliding rod is made by means of a clamp $i^6$, that can be tightened down on its spindular shank. Opposite this follower and affording but a narrow space between the contiguous surfaces of the two is a yielding presser-slide or "back-stop" K, adapted to travel the whole length of the packing-box or any suitable distance therealong and connected with a cord, chain, or strap K', which passes beneath a guide-pulley $k$, then up and over an elevated guide-pulley $k'$, and is finally provided with a sufficient weight $k^2$ to draw the slide with the proper force against the envelopes received in the box.

The floor of the packing-box immediately in front of the follower is slotted and receives a rock-shaft $K^2$, having upstanding pins $k^3$, which are held normally in a vertical position by means of weight-arms $k^4$, attached to said shaft and playing in the slots, and which may be termed the "bottom gate." Another rock-shaft $k^5$ overhead has a pendent flange $k^6$, vertically above the upstanding pins and forms an overhead gate. The follower is slotted at its lower edge, as at $k^7$, Fig. 5, that in its withdrawal or retrograde movement it may pass the upstanding pins, which are rigidly stopped in a vertical position against movement in that direction, but are permitted to yield in the other. Therefore, whenever the follower moves forward to press an envelope into the pack accumulating against the back-stop or presser-slide it causes the upstanding or bottom gate to fold down flat and the overhead gate to swing up, so that the envelope passes them; but when it withdraws they assume their vertical position again and prevent the envelope from falling back or being pressed back toward the follower. Thus a free space is always maintained for the reception of the succeeding envelope or envelopes from the dumping-box and delivery-aprons between said follower and the gates.

The nipper-carriage has side bars L, which are flush with the top and embrace and move past the ends of a rectangular frame L', corresponding in outline and size with the mouth of the folding-box, over which it fits and to which it is secured, or of which it may be an integral part, and between which and the plunger the envelope-blank is creased when the plunger descends. The top of this frame is smooth, and beyond it project from said side bars two fingers $l$, curved slightly downward and intended to pass beneath the blank held by the picker in the forward reciprocation of said carriage, which is of such extent that the blank is brought to the same position over the side bars that it should occupy when they have carried it back to the creasing-frame.

Pivoted upon the bridge B', connecting the runners of said carriage, are two nipper-jaws $l'$, one directly over each of the side bars of the carriage—that is, the bars which terminate in the just-mentioned fingers and embrace the end bars of the rectangular creasing-frame. These nipper-jaws are intended to come at each side of the picker above the blank held thereby, but beneath the projected lugs from the stripper-plate and above the jaws, and to their shanks are fixed fingers $l^2$, which may be termed "depressing-fingers," that in the forward reciprocation of the carriage pass above said lugs and are brought in the downward movement of the jaws toward and just against the upper surface of said lugs, so that in the further rise of the picker, which will at this moment be caused by an outsetting reach $l^3$ on the plunger-cam, they will retain the stripper-plate until the gumming-edges of the picker have risen therefrom, thus detaching the gummed blank from said edges and leaving it firmly nipped between the jaws and the carriage, when the latter will commence its return reciprocation, withdrawing the fingers from engagement with the stripper, which will be restored to its normal position by the force of its springs, and carrying the blank to a point above the mouth of the folding-box where the jaws will open and then the plunger descend and the blank be forced through the creasing-frame and down to the bottom of the folding-box, after which the plunger will rise leaving the envelope with its flaps turned up vertically along the walls of the folding-box and its back resting against the platen.

The opening and closing of the nippers are effected by cams $L^2$, acting against tail-pieces $l^4$ on the nippers and mounted upon a rock-shaft $L^3$, at one end of which is a pendent lug $l^5$, normally resting against a stop $l^x$ from the bridge and standing in the path of tappets $l^6$ and $l^7$ on a reciprocating rod $L^4$, which may be termed the "trip-rod" or "trip-bar." This latter is slotted at the inner end or circular-receiving end of the machine to take over a shaft $L^5$, driven from the platen-shaft by the inclined spindle $L^6$ and bevel-gears $L^7$, and upon which shaft is mounted a cam $L^8$ in contact with an anti-friction roll $l^8$ on said rod. A coiled spring $l^9$, acting to draw the rod back, preserves such contact, but permits the rod to be projected. Thus at the proper time it will move forward, striking one of the tappets against the lug $l^5$, rocking the shaft and opening the cams away from the tail-pieces of the nippers, which will then be forced down by springs $l^{10}$ and lift the jaws away from the carrier-frame, as in Fig. 8; but when the carriage has taken its forward travel and reaches its position of temporary rest beneath the picker the anti-friction roll upon this trip-rod passes off of the cam and it is drawn back by its spring, causing the second tappet to strike the lug and turn the cam to force the nippers down to grasp the blank.

When the nipper-carriage deposits the envelope-blank over the folding-box, it sometimes happens that the blank is slightly out of position, and to remedy this we place upon the rear or inner side of the creasing-frame at the points where the re-entrant angles between the back and side flaps should come stationary or fixed stops $m$, and on the outer or front side of the folding-box arrange a rock-shaft M, having fingers $m'$ thereon. A crank-arm $m^2$ from the rock-shaft is provided with a pin or anti-friction roll $m^3$, taking into a slot $m^4$ in a hanger $m^5$ from the trip-bar, so as to be actuated thereby. These adjusting or tucking fingers are moved immediately after the blank has been deposited over the folding-box and push or tuck the blank against the stationary stops on the other side of the box, thereby bringing it perfectly into position. With the forward reciprocation of the nipper-carriage to receive a fresh blank these adjusting-fingers are turned down and held down out of the way until the return has taken place and another blank has been deposited over the creasing-frame and folding-box by the nippers.

Arms N are secured to the bridge on the nipper-carriage and projected rearwardly, overhanging the bed of the machine, and at their extreme ends receive a rock-shaft $N'$, from which depend rake-teeth $n$. A crank $n'$ from this rock-shaft is connected by a link $N^2$ with an arm $n^2$ from the same rock-shaft which carries the cams for closing the nipper-fingers, so that whenever this latter rock-shaft is moved by the tappets on the reciprocating rod the rake-teeth are either lifted to a horizontal position or turned down to a vertical position, as indicated in Figs. 7 and 8, and are sufficiently held in either position by the spring-pressure of the nipper tail-pieces upon the cams.

In the rearward movement of the carriage while the nippers are closed the rake-teeth are horizontal; but as the carriage reaches the extent of such rearward movement and the nippers open the rake-teeth are turned down to a vertical position, entering spaces between a series of slats $N^3$, constituting a flooring which extends from the mouth of the creasing-frame or folding-box to the conveyer that delivers matter from the circular-folding machine, and in the next forward traverse of the nipper-carriage they sweep along said slats or flooring until they reach the folding-box, their function being to carry the circular or other printed and folded matter forward along said flooring and deposit it through the creasing-frame and in the box. The sides of said flooring are inclosed by vertical plates $N^4$, forming a guideway or passage, the width of which is adjustable by means of slots $n^3$ and set-screws $n^4$, (see Fig. 12,) arranged at sufficient distance from each other to admit the folded material between them endwise and bent outward and slightly curving at their receiving ends $n^5$, so as to guide the folded matter properly into position on the flooring.

Just before the circulars or other matter are deposited in the box a cradle or rest composed of two or more reciprocating fingers $N^5$ is moved into and across the folding-box above the folding wings or lappers by means of the vibrating arm $n^6$ of an elbow-lever $N^6$, which is slotted to receive a bar $n^7$ from said cradle and allow for sufficient play to compensate for the arc movement of said arm. The other arm of the lever rests upon and is actuated in one direction by a cam N upon the platen-shaft to project the cradle-fingers across the folding-box, and they are withdrawn by a spring $n^8$ as the roller $n^9$ on the lever reaches the cut-away portion of the cam. This cradle serves to prevent the circular from tipping as it falls to the bottom of the box—that is, the circular might tip if it fell the entire distance at once; but by falling a short distance and then being intercepted by and momently received upon the cradle it has an opportunity to tip and is brought into a perfectly-horizontal position, when the cut-off fingers are immediately withdrawn, allowing only a sufficient interval for the circular to adjust itself, and then the latter falls again and this time into the open envelope waiting to receive it.

Through the rear side of the folding-box above the back flap of the envelope-blank pass one or more hooked or curved fingers O, attached to a rock-shaft $o$, as shown. The rock-shaft has a slotted arm $o'$, which receives a pin from one arm of a bent lever $O'$, the other arm having an anti-friction roll $o^2$, which travels upon the periphery of a cam $O^2$ upon the shaft $L^5$, the same shaft which actuates the trip-rod. The lever is held against the cam by a spring $o^3$, and so long as its roller follows the concentric outline of the cam the fingers are withdrawn from the folding-box; but whenever the roller falls into the cutaway portion of said cam the fingers are turned down into said box, being above and clearing the upstanding back flap of the envelope-blank, and striking the inside fold of the circular just deposited, as shown in Figs. 10, 23, and 23$^a$, presses this down flat. Through the center of the opposite wall of the box plays another finger $O^3$, pivoted to the supporting-arm $o^4$ from its bell-crank $o^5$ and having a cam outline, whereby it is guided by the aperture through which it plays and brought to the desired position within the box. The bell-crank $o^5$, like that which operates the other fingers, has a slotted arm $o^6$, that receives a pin from the end of one arm of the rock-shaft $O^4$, the other arm of which has a pin entering a slot in the adjacent end of the bent lever $O^5$, the opposite end of said lever being provided with an anti-friction roll $o^7$, traveling upon a cam $O^6$ on the before-mentioned shaft that actuates the trip-rod, and held against said cam by a spring $o^8$, which serves to operate the lever in one direction. The action of this latter cam comes after the action of the cam which moves the other pressing finger or fingers O, so that when its raised portion travels beneath the anti-friction roll of the lever the pivoted finger $O^3$ will be carried into the folding-box, clearing, like the other, the flap of the envelope, and moved down against the outer fold or flap of the circular matter, as in Fig. 10, to press it upon the inner fold. The two sets of fingers thus insure that the circular shall be laid and held flat before the folding of the envelope takes place. The pivoted finger, or the second in action, is of such curved outline as to its body and extends so far within the box that it permits the folding wing or lapper which presses down the seal-flap of the envelope to operate before it is withdrawn, thus practically sealing the circular within the envelope while it is held by the finger, or so confining it that it cannot unfold.

P and P' represent the folding wings or lappers for the side flaps of the envelope, which come into operation after the circular has been deposited therein and flattened down by the action of the pressing-fingers. Each of these has its face parallel and in close proximity with the upper surface of the platen when down in a horizontal position, as in the sixth figure of the drawings, but when erected into a vertical position closely abutting against the vertical edge of the platen to form therewith a box, and each has a shank formed with a curved slot $p$ described on an arc concentric with the upper adjacent edge of the platen, which plays over a pin $p'$, projecting from the folding-box or frame-work, and also with a heel extension $p^2$, having an anti-friction roll $p^3$, which travels in a curved guide-way $P^2$, also described on an arc concentric with the upper adjacent edge of the platen, but on a correspondingly longer radius than the curved slot, and each is operated by a rod $P^3$, slotted at its lower end to play over the platen-shaft and provided with an anti-friction roll $p^4$, which travels on a cam $P^4$, fixed to said shaft. At its upper end the rod is transversely slotted, as at $p^5$, to receive a pin $p^6$ from the lapper intermediate between the curved slot formed therein and the roller on the heel extension thereof. The weight of the actuating-rods alone is sufficient to open the lappers whenever the rolls upon these rods pass upon the depressed portion of the cams; but they may be assisted by springs, if desired. This construction and arrangement, and also that next described, is such that the lappers are caused to fold down flat upon the platen from its edges and to rest evenly upon its face without leaving an opening or yielding or slipping, their action being as if they were fulcrumed upon said edges, which in effect correspond to their axes of movement.

The cams by which the side lappers are operated are so timed that the lapper P, which folds the ungummed side flap of the envelope, acts first and is immediately succeeded by the other before it rises, so that the two rest for a time concurrently upon the envelope. The folding wing or lapper Q for the back flap of the envelope and that for the seal flap Q' are also pivoted outside of the folding-box and away from the platen on an axis coincident with the rear and front upper edges of the platen by means of bails $q$, pivoted on an axis coincident with the upper longitudinal edge of the platen, and bearings $q'$, taking over pintles $q^2$ from the bails, and are operated by rods $Q^2$, slotted at their lower ends to embrace the platen-shaft and having rollers $q^3$, which ride upon cams $Q^3$ on said shaft in order to close said lappers down upon the platen, and which descend by their own weight or by the force of springs whenever the rollers pass upon the retreating part of the cam, so as to open the lappers.

When the envelope is to be sealed, the lapper Q for the back flap of the envelope operates first after the descent of the side lappers, so as to fold said flap down and paste it upon the side flaps, and the lappers for the seal-flap come down upon the platen and complete the envelope. At this moment the platen may rise, as hereinbefore suggested, to squeeze the envelope against all four of the lappers which are still resting thereon; but we prefer rather to give the platen a slight drop just as each lapper comes down and then lift it quickly against the lapper, just as the latter is over and down or nearly down, and for this purpose employ the cam $Q^4$, (shown in Fig. 10$^c$,) in which the raised periphery $q^4$ is practically uniform as to its distance from the axis, but which is notched or cut away slightly at the points 1 and 2 toward the termination of such raised periphery and at points corresponding in time with the initial movement of the lappers, so that the platen-support may momently drop into these recesses and then rise again, carrying with it the platen.

Plates $q^5$ may be used for the purpose of filling or partially filling the notches to do away with or regulate the drop, according to the thickness of the mail-matter, no drop at all being necessary when operating upon empty blanks.

Sometimes it is desirable to have the envelope folded with the seal-flap ungummed and tucked inside, and generally so when the inclosures are exclusively printed matter. For this purpose one of the edges of the picker is removed, as already stated, and it becomes necessary that the lapper for the seal-flap shall operate before those for the side and back flaps. Therefore the cam for closing said lapper for the seal-flap is provided with a detachable section $q^6$, as in Fig. 20, which whenever present actuates said lapper in advance of the one for the back flap, but when removed leaves the main cam of such shape and so timed that it actuates said lapper after the back flap has been laid down and therefore brings the seal-flap down upon the back flap.

It will be observed by reference to Figs. 6 and 7 of the drawings that the side, back, and seal edges of the lappers all stand vertical at the moment a blank is to be received, the back and seal flaps perhaps flaring a little outward and being beveled, so as to maintain their close fit with the box until they are called upon to fold down upon the envelope-flaps and seal them in conjunction with the end flaps, but that as soon as the envelope is formed, with or without inclosures, the entire box opens, or, in a sense, is knocked down, so that there is no danger of completed envelopes sticking in the box, and so that as soon as the envelope is finished the box for a moment ceases to exist.

For the proper understanding of the mode in which circulars are folded and delivered to the apparatus thus far described reference may be had particularly to Figs. 11 and 12 of the drawings, wherein is shown so much of the folding apparatus made the subject of our before-mentioned application as is necessary to the purpose of the present explanation.

R represents two or more properly-spaced slats for the support of the circulars or printed matter or whatever is to be folded, and along which they are carried by suitable conveyers until each in its turn comes over the bed R′, to which a vertical reciprocation is given along the ways by an anti-friction roller $r'$, traveling upon a cam $R^\times$, hereinafter more particularly described. Above this bed is shown the paddle $R^2$, which is reciprocated longitudinally over and corresponds in length and breadth to about the dimension of the bed. Whenever in its movement it has come above the circular $r^\times$, deposited upon the slats, it is depressed vertically, the bed at the moment having risen to or about to the under surface of the circular. Then, the two descending simultaneously, the paddle passing between the two innermost slats, the folder-blades $r^2$ operate in succession to lay the flaps of the circular or other matter over the paddle, when the latter is withdrawn horizontally, leaving said folded matter still upon the bed, which now descends until it comes on a level with the opening between the squeezing-rollers $r^3$, when pushing-fingers $R^3$, constituting a tricker, are brought against said folded matter and deliver it between these rollers, by which it is carried forward and deposited upon a carrier or conveyer composed of endless belts $R^4$, stretched over drums or pulleys $r^4$ and $r^5$, the former being driven constantly by any suitable motor timed from the envelope-machine. These carrier or conveyer belts are shown in the present instance as terminating between the slats $N^3$ of the envelope-machine, which are traversed by the rake, as hereinbefore described, and they feed the folded matter to said slats and between the side wings thereof into position to be caught by the rake and carried forward to the folding-box; but, in order to straighten this matter before the rake falls and also to prevent its being carried too far forward, a cut-off composed of a rock-shaft $R^5$, having teeth $r^6$, and normally held with said teeth in a horizontal position below the slatted flooring by means of a spring $r^7$, coiled around its shaft, but rocked to bring said teeth into a vertical position projecting through said flooring by means of a tappet $r^8$ on the trip-bar striking a crank $r^9$ on its shaft in the rearward or inward movement of said bar, which takes place just before the rearward movement of the carriage, and held in such position upon the recession of the carriage itself by a stop $r^{10}$ from the carriage-bridge when the trip-bar moves forward to open the nippers, is arranged at a suitable distance beyond the delivery end of the carriers, so that each circular may be fed against the teeth and stopped or cut off from its forerunner and positioned or squared for the rake to come down behind it at the termination of the rearward traverse of the nipper-carriage. When, however, the carriage starts forward for a fresh blank, the crank from the cut-off shaft is released from its stop by the departure of the bridge, and the spring carries the teeth once more beneath the flooring to permit the circular or other folded matter to be raked therepast.

It sometimes happens that the circular is delivered from the folding-machine a little beyond the point at which it should properly strike the carriers, aprons, or belts, and to rectify this we place a quarter-crossed belt S alongside the two horizontal belts of the conveyer on the side to which the circular tends to be carried. At the end next the circular-folding devices this belt runs upon a horizontal pulley $s$ in axial line with and upon the same shaft as the pulleys of the other conveyer-belts, but is gradually twisted toward the vertical until its opposite end is carried over a vertical idle-pulley $s'$ upon the envelope-machine proper and elevated so that its lower edge lies practically in the same plane with the upper surface of the horizontal belts. In order to bring the last half of its inner web or ply entirely vertical, a second vertical idle pulley or roll $s^2$ is arranged midway between the two end pulleys, as shown. Thus the twisted belt serves at first to carry and then to deflect and push the folded matter sidewise and edgewise until it reaches the proper position to be delivered upon the slatted flooring of the envelope-machine. The vertical pulley on the envelope-machine at the end of this twisted belt is mounted, as shown in Fig. 12, upon a pintle from an adjustable bracket S′, secured to the bed of the machine by a bolt $s^3$, passing through a slot $s^4$ in its foot, whereby it can not only be adjusted to stretch the belt, but can be moved toward or from the other belts of the carrier to properly position the folded matter.

For the purpose of driving and timing the folding mechanism concurrently with the enveloping mechanism and imparting the proper movements to the folding bed, paddle, and blades, and to the tucker and squeezing-rolls, the driving-pulley upon the shaft A′ may be replaced by a bevel-gear $t$, intermeshing with a corresponding gear $t'$, keyed to a main driving-shaft T, mounted in bearings $t^2$ along the side of the machine and carrying fast and loose pulleys $T^4$ $T^2$, whereby it may be driven from a line-shaft or left idle. At one end this driving-shaft may have a fly-wheel $T^3$, which may also serve as a hand-wheel to actuate the mechanism controlled by said shaft without recourse to the power-drive, and at the other end it will have a bevel-gear $t^3$, meshing with and driving a corresponding gear $t^4$ on a short transmission-shaft $T^4$, mounted in bearings $t^5$, one or more of which are in a bracket $T^5$ to one side of the frame $T^6$, which supports the folding mechanism, and which may be bolted to or otherwise made rigid with the framework supporting the enveloping devices. A spur-pinion $t^6$ on this transmission-shaft drives an idler $t^7$, which communicates motion to the gear $T^7$, keyed to a counter-shaft $T^8$ beneath the immediate folding mechanism, and carrying cams for operating it, and is therefore hereinafter termed the "folder-shaft."

The folding-paddle is secured to the end of a horizontal rod or shank $t^8$, which plays through and is guided by bearings $t^x$ and $t^9$, one in the end of the arm $T^9$, setting out from a vertically-reciprocating bar U, and the second in an enlargement near the upper end of said bar, which latter is guided in its movement by the sleeves $u$ at the upper and lower ends of a bracket U', secured to and overhanging from the supporting-frame of the machine. The foot of this vertical bar is flattened and slotted, as at $u'$, to take over the folder-shaft, and is provided with two anti-friction-rolls $u^2 u^3$, one at the upper end of the slot and at the side of the flattened extension and the other at the lower end of the slot and at the opposite side of said extension. On each side of the flattened part are cams $U^2$ $U^3$, fixed to the folder-shaft, the first cam engaging with the upper anti-friction roll to raise the bar, and the second cam, succeeding at the proper time the action of the first, engaging with the lower anti-friction roll to depress the bar positively, thereby through the alternate action of the cams raising and lowering the folding-paddle. In order to impart this movement, a vertical opening is made through the paddle rod or shank at $u^4$ to receive the upper end or arm of an elbow-lever U$^4$, journaled or fulcrumed on a shaft $u^5$, carried in brackets or hangers U$^5$ from the frame and either turning on said shaft or with it. The other arm of this hanger is connected by a link $u^6$ with a longitudinally-slotted yoke U$^6$, which embraces the driving-shaft, and is provided at each end of its slot and on opposite sides thereof with anti-friction rolls $u^7$ $u^8$, which alternately engage cams U$^7$ U$^8$, fixed to the folder-shaft to depress and raise the yoke, the first movement projecting the paddle and the second withdrawing it, the arrangement of the cams being such that the paddle will be held stationary against horizontal movement for a definite interval at each end of its reciprocation, and particularly at the limit of the forward projection, that it may have time to descend upon and with the bed beneath the table.

The reciprocations of the folding-blades over the bed correspond with the distance from the opening in the table to about the longitudinal center thereof, and in order to so limit their inward movement they are constructed with shoulders $w$ upon their under surfaces, which impinge against the side edges of the bed whenever one or the other of the knives is carried thereacross. The shanks W of these blades pass through guide-bearings W', secured to and depending from the under surface of the table, and the outer edges of these shanks are provided with trunnions $w'$, which pass through elongated slots $w^2$ in the upper ends of arms of elbow-levers W$^2$, fulcrumed by means of journals $w^3$, taking into bearings on the frame and engaging by means of anti-friction rolls at the ends of their lower converging or power arms with cams W$^3$ on the drive-shaft almost reversely set, so that one knife may move first to lay one flap and the other follow it to lay the second fold or flap over the first. Springs $w^4$ act upon the elbow-levers in such manner as to urge the blades inward toward the bed whenever the anti-friction roll on the end of the power-arm reaches the cut-away reach $w^5$ of its cam.

The cam which operates the bed revolves in the direction indicated by arrows in Fig. 20 and has several reaches, the first of which, numbered 1, is the lowest or described on the shortest radius and is concentric with the axis of the driving-shaft, so that while the anti-friction roll at the foot of the supporting-stud of the bed-frame is traveling on this reach the bed will be at its lowest position and stationary for a considerable interval of time, sufficient for the ejection of the previously-folded material and for the bringing of fresh material upon the table above it. The next reach, numbered 2, is a rapid outward reach or rise, terminating upon a radius of sufficient length to carry the top of the bed flush with the table when it sinks rapidly away to the succeeding reach, numbered 3, concentric with the axis of the driving-shaft, like the first, but on a longer radius, and adapted to bring the bed beneath the transversely-reciprocating folding-blades, but so slightly below them as to allow them to just clear the paddle when they successively move inward over the bed. To this third reach succeeds the one numbered 4, which is a short outward rise on a radius less than the second reach to carry the bed up against the overlying folding-blades immediately after the paddle has been withdrawn, so as to squeeze the folded material against these blades and permanently set the fold. In this last movement the elastic or yielding connection between the bed and its support serves to compensate for any variation in the thickness of the material being folded—as, for instance, when several circulars have been nested together to form a single inclosure for the mail. Rapidly succeeding the squeezing of the folded matter against the blades the anti-friction roll on the stud returns to the first reach of its cam by a speedy inward incline, bringing the bed abreast the squeezing-rolls, into which the folded material is carried by the pushing-fingers. These fingers may be formed as prongs from a shank Y, (see Figs. 20 and 21,) and are pivoted, as at $y$, to the upper end of a rod Y', rising from lugs $y'$, projecting from the collars $Y^2$, keyed to the rock-shaft $Y^3$, from which rises an arm $y^2$, having upon its end an anti-friction roll $y^3$, in contact with the periphery of a cam $Y^4$ upon the folder-shaft, whereby the push-fingers are opened away from the folding-bed, while a yoke $y^4$, uniting said collars on the side opposed to the lugs and acted upon by a spring $y^5$, carries said fingers toward and over the bed whenever the retreating trend of the cam permits. The heel end of the shank of the push-fingers is acted upon by a spring $y^6$, arranged in such manner and under such normal tension that when the fingers are fully opened away from the bed their points will be thrown up, as represented in Fig. 22; but when carried toward the bed the points are depressed, as in Fig. 20, to come in contact with the material carried thereby and move over the upper surface thereof as they push such material into the grasp of the squeezing-rolls. Said rolls are driven from the before-mentioned driven gear of the folder-shaft by means of the intermeshing pinion Z, the concentric gear Z', rigid therewith, the idler $z$, meshing with a pinion $z'$ on the end of one of the squeezing-rolls, a second pinion $z^2$ on said roll, engaging with an equal pinion $z^3$ on another roll diagonally thereabove, a pinion $z^4$ on the latter, engaging with an equal pinion $z^5$ on the roll directly beneath, and a third pinion $z^6$ on the first roll in the above-related train, driving a pinion $z^7$ on the last roll of the four, which in its turn carries at its opposite end a pinion $z^8$, engaging with and driving a pinion $z^9$ on the shaft carring the conveyer drums or pulleys $r^4$, and thereby imparts motion to the conveyer-belts.

In operation we will suppose the machine to be at the stage of action represented in Figs. 2 and 3, with the plunger-frame just on the point of riding off the raised portion of its cams, an envelope-blank to be lying over the folding-box, where it has been deposited by the last retrogression of the nipper-carriage, and a circular lying on the slatted flooring between the cut-off and the rake. The picker and the plunger will now simultaneously descend, the former to take up a fresh envelope-blank and the latter to crease the already-deposited blank and carry it home to the platen at the bottom of the folding-box and leaving it, as it rises, with its back resting against said platen and its flaps extending vertically alongside the walls of said box. The picker and plunger having now risen to their full height, the former holding a freshly-gummed blank, the nipper-carriage moves forward to grasp said blank, and the rake on said carriage takes along with it the circular previously lying between it and the cut-off and deposits it upon the intersecting fingers or cradle in the folding-box, as in Figs. 26 and 26ª, while the conveyers feed a fresh circular against the cut-off between the slats. As the nippers reach the blank the depressing-finger above them passes over the lugs from the stripper-plate. Then the nippers fall, clamping the blank against the carriage-frame and bringing said fingers against the lugs, and at the same moment the picker is given a slight additional upward movement by the outward reach on the plunger-cams, causing its gumming-edges to rise above the stripper-plate, and thereby separating them from the blank. Then the nipper-carriage starts on its return movement with the rake open and stops with the freshly-taken blank above the mouth of the folding-box and releases it, when it is positioned by the adjusting-fingers, as heretofore explained, ready for the next descent of the plunger; but meanwhile the cradle-fingers have been withdrawn, the previously-deposited circular allowed to drop into the open envelope, as in Figs. 27 and 27ª, the inner flap of the circular has been smoothed down by the descent of the fingers O, as in Figs. 28 and 28ª, and those fingers withdrawn, the outer flap has been pressed down upon the inner by the descent of the finger $O^3$, as in Figs. 29 and 29ª, one of the flaps of the envelope—for instance, the ungummed seal-flap—has been folded down, as in Figs. 30 and 30ª, the ungummed side flap folded thereon, as in Figs. 31 and 31ª, the gummed side flap placed over the two, as in Figs. 32 and 32ª, and then the finger $O^3$ rises and the back flap is folded down upon the side flaps, as in Figs. 33 and 33ª, all by the appropriate lappers. During the retrograde movement of the nipper-carriage the gum-box has been carried beneath the picker, gumming its edges, as in Fig. 10, and as the nipper-carriage comes to a stop, this box is returned to its initial position, the gumming-rollers being rotated in such return to take up and distribute a fresh supply of gum. The envelope-blank having received its inclosure and having been folded over and sealed upon or otherwise inclosed and confined it for mailing, the lappers open, the platen descends until it reaches the head of the chute, where its ejector-fingers discharge the envelope, which slides down said chute into the dumping-box and is immediately dropped therefrom to the vertical delivery aprons or belts, its discharge being insured by the fixed ejector-fingers which pass through the slots in the bottom of the box. As the envelope emerges from these delivering-belts it is deposited in front of the follower in the packing-box. The follower carries it past the gates and presses it against the back-stop, which yields and gives slightly and then becomes stationary. The platen now having risen and again closing the bottom of the folding-box the plunger descends, creases a fresh blank just deposited, and carries it against the platen, and the operations already described are reproduced concurrently or in sequence in their proper turns.

Having thus described our invention, we wish it to be understood that so far as it relates to the folding and inclosing of circulars and other printed matter within envelope-blanks or partially-formed envelopes and the closing or sealing of such blanks upon the contents, we do not limit ourselves to the specific devices, either for folding the circulars or for forming the envelopes thereover, herein described, but propose to use any suitable folding mechanism for circulars or inclosures and any suitable envelope mechanism to which such circulars may be fed and properly delivered from the folding devices so long as the principle of our invention is persisted in; nor do we limit ourselves in regard to the various novel features of the subordinate groups of mechanism to their use in connection with a circular-folding machine or with mechanism for supplying circulars to the envelope-machine, considering that they may be used generally in envelope-machines irrespective of the inclosing of circulars within envelopes; but

What we do claim, and desire to secure by Letters Patent, is—

1. The combination, substantially as hereinbefore set forth, with the creasing and folding apparatus in an envelope-machine, of feed devices for delivering folded mail-matter to the folding-box after the creased envelope is deposited therein.

2. The combination, substantially as hereinbefore set forth, with the envelope-folding box and its plunger, of a table for supporting a stack of envelope-blanks, a picker having gumming-edges, devices for conveying said blanks one at a time to the folding-box, and a carrier adapted to feed folded mail-matter to said box and deposit it upon the blank.

3. The combination, substantially as hereinbefore set forth, with apparatus for gumming, creasing, and folding envelope-blanks, of an intermittent rake or carrier acting immediately after the creasing mechanism to deliver folded mail-matter into the partially-formed envelope.

4. The combination, substantially as hereinbefore set forth, with apparatus for gumming, creasing, and folding envelope-blanks, of an intermittent rake or carrier acting immediately after the creasing mechanism to deliver mail-matter into the partially-formed envelope, and endless belts or aprons for delivering such mail-matter into the range of action of said rake.

5. The combination, substantially as hereinbefore set forth, with apparatus for gumming, creasing, and folding envelope-blanks, of apparatus for folding circulars and other mail-matter, and feed devices to which said apparatus delivers, arranged to carry the folded matter to the envelope-folding box and deposit it in the blank previously delivered thereto prior to the action of the folding wings or lappers.

6. The combination, substantially as hereinbefore set forth, of mechanism for folding circulars and similar mail-matter, a creasing and folding box for envelope-blanks, a carrier for delivering the folded mail-matter thereto, and squeezing-rolls acting upon such mail-matter in its passage from the circular-folding apparatus to the envelope-folding box.

7. The combination, substantially as hereinbefore set forth, with the squeezing-rolls and the conveyer leading therefrom and with the envelope creasing and folding box, of the circular-folding bed, accessory folding devices, and the tucker arranged to sweep folded matter from said bed and into the grasp of the squeezing-rolls.

8. The combination, substantially as hereinbefore set forth, with apparatus for gumming, creasing, and folding envelope-blanks, of apparatus for folding circulars or other mail-matter, a carrier to which it delivers, and an intermediate rake receiving from said carrier and delivering to the folding-box after the creased envelope is deposited therein.

9. The combination, substantially as hereinbefore set forth, with apparatus for gumming, creasing, and folding envelope-blanks, of apparatus for folding circulars or other mail-matter, an intermediate carrier, and a cut-off arranged and actuated to temporarily stop and straighten said folded matter.

10. The combination, substantially as hereinbefore set forth, with apparatus for gumming, creasing, and folding envelope-blanks, of apparatus for folding circulars and other mail-matter, endless conveyer-belts to which said latter apparatus delivers, a cut-off against which the belts carry the folded material, and a reciprocating rake taking said material from the cut-off and delivering to the envelope-folding box.

11. The combination, substantially as hereinbefore set forth, with the envelope-folding box and the rake or conveyer for delivering mail-matter thereto, of the cradle arranged and actuated to temporarily receive such matter about midway between the top and bottom of the box.

12. The combination, substantially as hereinbefore set forth, with the envelope-folding box, of the slatted flooring leading thereto, the conveyer-belts delivering to said slatted flooring, the cut-off and straightener playing through the interslatal spaces of said flooring, the folding apparatus for mail-matter delivering to the conveyer-belts, and the reciprocating rake sweeping said flooring from the conveyer to the folding-box.

13. The combination, substantially as hereinbefore set forth, with the envelope-folding box and the apparatus for folding circulars, the conveyer-belts leading from said apparatus, and the flooring leading from said belts to the folding-box, of the sides to said flooring, curved outwardly at their receiving ends to form with said flooring a guideway or passage for the folded material.

14. The combination, substantially as hereinbefore set forth, with the envelope-folding box and the flooring which leads thereto, of the adjustable sides for said flooring.

15. The combination, substantially as hereinbefore set forth, with the apparatus for folding circulars and other mail-matter, of the horizontal conveyer belt or belts leading therefrom and the guideway or passage to which they deliver, the twisted belt lying alongside of said horizontal belts and mounted upon a horizontal roll at the receiving end and a vertical roll at the delivery end.

16. The combination, substantially as hereinbefore set forth, with the circular-folding apparatus and the envelope-folding box, of the flooring leading to the latter, the adjustable sides or walls to said flooring, the conveyer-belts receiving from the circular-folding apparatus and delivering to said flooring, and the twisted guide-belt and its adjustable vertical pulley at the entrance to said flooring.

17. The combination, substantially as hereinbefore set forth, with the twisted belt and the horizontal conveyer-belts, the circular-folding apparatus, and the envelope-folding apparatus, of the adjustable vertical pulley at the discharge end of said twisted belt.

18. The combination, substantially as hereinbefore set forth, with the envelope-folding box, the apparatus for folding circulars and other mail-matter, the horizontal conveyer-belts leading therefrom, and the walled flooring or guideway leading from said belts to the envelope-folding box, of the twisted belt to one side of said horizontal belts, its horizontal and vertical end pulleys, and the intermediate vertical idle-pulley.

19. The combination, substantially as hereinbefore set forth, with the picker, of the reciprocating gum-carriage, the distributing and gumming rolls carried thereby, the rack upon the frame, the pinion meshing with said rack, and the backing-ratchet or one-way clutch connecting said pinion to the gumming-rolls, whereby the latter is revolved in the movement of the carriage away from the picker and is detached from its driving connection when moving toward and beneath the picker.

20. The combination, substantially as hereinbefore set forth, with the picker and with the nipper-carriage and nippers thereon, of the stripper-plate and means whereby the stripper-plate is brought beneath the gumming-edges to detach the blank therefrom after it has been lifted from the stack and seized by the nippers.

21. The combination, substantially as hereinbefore set forth, with the picker, of the stripper-plate having outsetting lugs, the pins from said plate, the springs coiled around said pins and normally holding the plate above the plane of the gumming-edges, the reciprocating carriage, and depressing-fingers upon said carriage to act upon said lugs.

22. The combination, substantially as hereinbefore set forth, with the picker and the stripper-plate having projecting lugs, of the nippers, the depressing fingers or stops engaging with the lugs of the stripper-plate, and mechanism acting to give the picker an additional upward movement after the blank has been caught by the nippers and the depressing-fingers have engaged the said lugs, whereby the gumming-edges of the picker are caused to rise above the stripper-plate that the gummed blank may be detached by the latter.

23. The combination, substantially as hereinbefore set forth, with the picker and with the rising and falling table supporting the stack of blanks, of actuating mechanism for the two operating to elevate both concurrently, but at a differential speed, whereby the picker separates the top blank from the stack gradually.

24. The combination, substantially as hereinbefore set forth, with the picker and the folding-box and plunger, of the reciprocating nipper-carriage having side bars moving past each end of said box and nipper-jaws above said side bars.

25. The combination, substantially as hereinbefore set forth, with the picker and folding-box and plunger and with the creasing frame or mouth at the top of said folding-box, of the reciprocating nipper-carriage having side bars embracing the ends of said creasing-frame and flush with the top thereof, and the nipper over each of said side bars.

26. The combination, substantially as hereinbefore set forth, with the picker and its stripper-plate and with the folding-box and plunger and creasing-frame at the top of the folding-box, of the reciprocating nipper-carriage having side bars embracing the ends of said creasing-frame and flush with the top thereof, the nippers over each of said side bars, and the depressing fingers or stops above the nipper-jaws, arranged to engage with the stripper-plate when the nippers are depressed.

27. The combination, substantially as hereinbefore set forth, with the picker, of a detachable gumming-edge for the seal-flap of the envelope-blank, the folding-box and its lappers, and means whereby the seal-flap lapper may be caused to act in advance of or later than the back-flap lapper.

28. The combination, substantially as hereinbefore set forth, with the picker, of a detachable gumming-edge for the seal-flap of the envelope-blank, the folding-box and its lappers, and a cam for the seal-flap lapper, having a detachable section, whereby said lapper may be caused to act in advance of or later than the back-flap lapper.

29. The combination, substantially as hereinbefore set forth, of the reciprocating nipper-carriage, the nippers mounted thereon, the springs normally holding the nippers open, the cam-shaft and cams whereby they are closed, the crank-arm from said cam-shaft, and the reciprocating trip-rod and its tappets, whereby the cam-shaft is actuated at the terminal of each reciprocation to carry the nippers down upon the blank when the carriage reaches the picker and to open them when the carriage has conveyed the blank to the creasing-box or mouth of the folding-box.

30. The combination, substantially as hereinbefore set forth, with the picker, the folding-box and plunger, and with the reciprocating nipper-carriage, of the stationary stops at the rear of the folding-box and the vibrating tucker or placer fingers at the front thereof to properly position the blank for the action of the plunger.

31. The combination, substantially as hereinbefore set forth, with the picker, the folding-box and plunger, and the lappers for folding the envelopes, of the reciprocating nipper-carriage, the nippers carried thereby, the slatted flooring at the rear of the folding-box, and the rake mounted upon the nipper-carriage and sweeping said flooring in its forward movement to convey mail-matter to the folding-box.

32. The combination, substantially as hereinbefore set forth, with the picker, the folding-box, and plunger, of the reciprocating nipper-carriage, the nippers mounted thereon, the cam-shaft and cams whereby they are closed and the springs whereby they are held open, the reciprocating trip-rod acting upon an arm from the nipper cam-shaft, the vibrating rake mounted in bearings supported by the nipper-carriage, the crank-arm from the rake-shaft, and the link connecting said arm with an arm from the nipper cam-shaft, whereby both the rake and the nippers are operated by the trip-rod.

33. The combination, substantially as hereinbefore set forth, with the vibrating rake upon the reciprocating nipper-carriage and with the slatted flooring which it traverses or sweeps, of the vibrating cut-off beneath said flooring, with its fingers arranged to be projected through the interslatal spaces and the trip-rod having tappets to open and close the rake and a lug to lift the cut-off.

34. The combination, substantially as hereinbefore set forth, with the nipper cam-shaft, the rake and the cut-off, of the stops upon the bridge of the nipper-carriage.

35. The combination, substantially as hereinbefore set forth, with the folding-box and its stationary stops, of the tucker-shaft and its crank-arm and the trip-rod and its lug, whereby the tucker is opened and closed at proper intervals.

36. The combination, substantially as hereinbefore set forth, with the folding-box and its reciprocating platen, of the chute and the ejector-fingers pivoted to said platen and means whereby said fingers are raised from the platen as it reaches the head of the chute to discharge the envelope.

37. The combination, substantially as hereinbefore set forth, with the folding-box and the platen, of the chute, the vibrating dumping-box, its curved shield, and the vertical belts to which the dumping-box delivers.

38. The combination, substantially as hereinbefore set forth, with the folding-platen and plunger, of lappers folding over the edge of said platen as a fulcrum and forming the lower part of the folding-box.

39. The combination, substantially as hereinbefore set forth, with the tilting envelope-dumping box, of the ejector-fingers fixed to the frame and passing through slots in the dumping-box when the latter is tilted to discharge its contents.

40. The combination, substantially as hereinbefore set forth, with the envelope-chute and the vertical belts delivering to the packing-box, of the intermediate dumping-box having fingers at its discharge edge which enter between the pulleys at the head of the adjacent set of belts.

41. The combination, substantially as hereinbefore set forth, with the envelope-folding box and carrier and devices for delivering folded circulars or similar mail-matter thereto, of the presser-fingers moving in succession through opposite sides of the box to lay the flaps of the folded material smoothly therein.

42. The combination, substantially as hereinbefore set forth, with the folding-box, of the pressing-finger for the top flap of the folded mail-matter therein and a vibrating arm upon which it is pivoted, said finger having a cam outline, as and for the purpose set forth.

43. The combination, substantially as hereinbefore set forth, with the folding-box, the conveyer devices for supplying envelope-blanks thereto, and devices for feeding folded inclosures to said blanks as they lie within the box, of the presser-fingers entering through the sides of the box to lay the flaps of said inclosures alternately, and the folding wings or lappers for the blanks, succeeding in action the movement of the presser-fingers.

44. The combination, substantially as hereinbefore set forth, with the folding-box and its lappers, of a cam for operating the lapper for the seal-flap, provided with a detachable section, whereby the time of movement of said lapper may be varied.

45. The combination, substantially as hereinbefore set forth, with the folding-box and platen, of folding wings or lappers arranged to vibrate on axes practically coincident with the upper edges of said platen when elevated.

46. The combination, substantially as hereinbefore set forth, with the folding box, of lappers for the end flaps, having curved slots described on an arc practically concentric with the upper adjacent edge of the platen when elevated, the pins taking into said curved slots, curved guideways into which the heel extensions of said lappers take, and the reciprocating rods pivoted to said lappers between the guideways and the slots.

47. The combination, substantially as hereinbefore set forth, with the folding-box and its lappers and with the platen, of an operating-cam for said platen, having successive notches, as described, whereby the platen is caused to fall slightly as the lappers come down and then raised against them.

48. The combination, substantially as hereinbefore set forth, with the folding-box and its platen and lappers, of a cam for actuating said platen, having successive notches, as described, and detachable plates whereby the depth of said notches may be varied.

49. The combination, substantially as hereinbefore set forth, with the envelope-folding box and devices for delivering folded circular or inclosures thereto, of the cradle-fingers reciprocating through said box about midway of its height, a cam for projecting them, and a spring for suddenly withdrawing them, as and for the purpose described.

50. The combination, substantially as hereinbefore set forth, with the folding-box and its platen, and the reciprocating standard upon which said platen is mounted, of the independently-reciprocating plunger and the yielding connection between said platen and standard, whereby the platen may yield before the descending plunger to accommodate itself to the varying thickness of material.

51. The combination, substantially as hereinbefore set forth, with the folding-box and its platen and with the plunger, of the standard for the platen, the rods or spindles connecting said platen to the standard and playing through the latter, the coiled springs interposed between the platen and standard, and the adjusting-nuts on the rods, whereby the normal height of the platen may be positively varied.

52. The combination, substantially as hereinbefore set forth, with the plate which supports the stack of envelope-blanks, of posts and dividing-spurs arranged to come in contact with the gummed edges of the back flap about midway of their length, said spurs being upwardly and outwardly beveled.

53. The combination, substantially as hereinbefore set forth, with the plate which supports the stack of envelope-blanks, of the posts vertically slotted on the sides adjacent to the stack, the spindles playing in said posts, and the upwardly and outwardly beveled spurs playing through the slots therein.

54. The combination, substantially as hereinbefore set forth, with the plate which supports the stack of envelope-blanks, of stops for the rear edges of the blanks, arranged to come on each side of the center thereof, pivoted spring-gates, and means for locking said gates against movement on their pivots when closed.

55. The combination, substantially as hereinbefore set forth, with the plate which supports the stack of envelope-blanks, of the pivoted spring-gates having heel extensions and a removable hooked link connecting said heel-extensions.

56. The spring-gate F⁷, composed of a series of flat fingers $f^8$, turned downward at their outer ends to prevent the blanks from catching between them.

57. The combination, substantially as hereinbefore set forth, with the envelope-folding box and its lappers and with the plunger, of devices for supplying envelope-blanks to said box, devices for supplying folded inclosures thereto, and alternately-acting pressers for the flies or flaps of said inclosures, whereby they are laid flat before the action of the lappers upon the envelope-blank.

JAMES R. McDONALD.
TIMOTHY STEBBINS.

Witnesses:
A. S. WELLS,
M. D. O'CONNELL.